United States Patent
Nakayama et al.

(10) Patent No.: US 6,782,423 B1
(45) Date of Patent: Aug. 24, 2004

(54) HYPERTEXT ANALYZING SYSTEM AND METHOD

(75) Inventors: Takehiro Nakayama, Nakai-machi (JP); Hiroki Kato, Nakai-machi (JP); Yohei Yamane, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 663 days.

(21) Appl. No.: 09/655,063

(22) Filed: Sep. 5, 2000

(30) Foreign Application Priority Data

Dec. 6, 1999 (JP) .......................................... 11-345652

(51) Int. Cl.[7] .......................................... G06F 15/173
(52) U.S. Cl. .................. 709/224; 709/223; 707/500; 707/513; 707/526; 707/530; 706/59
(58) Field of Search ............................... 709/223, 224; 707/500, 526, 513, 530; 706/59

(56) References Cited

U.S. PATENT DOCUMENTS

| | | | | |
|---|---|---|---|---|
| 5,892,917 A | * | 4/1999 | Myerson ..................... | 709/224 |
| 6,470,383 B1 | * | 10/2002 | Leshem et al. ............. | 709/223 |
| 2003/0105682 A1 | * | 6/2003 | Dicker et al. ................. | 705/27 |

FOREIGN PATENT DOCUMENTS

JP       02000172708 A   *   6/2000

OTHER PUBLICATIONS

Perkowitz et al, Adaptive Sites: Automatically learning From User Access Patterns, WWW6, before 1999.*
Perkowitz et al., Adaptive Sites: an AI Challenge, IJCAI, 1997.*
Perkowitz et al., Adaptive Web Sites: Conceptual Cluster mining, IJCAI 1999.*
Perkowitz et al., Towards Adaptive Web Sites: Conceptual Framework and case Study, WWW8, 1999.*
Huberty, Carl J., "Applied Discriminant Analysis", John Wiley & Sons, Inc., 1994, pp. 117–123.
Perkowitz et al., "Adaptive Web Sites: Automatically Synthesizing Web Pages", in proc. of AAAI–98.
Saltron et al., "Text Retrieval Using the Vector Processing Model", in proc. of SPAIR–94, 1994, pp. 9–22.

* cited by examiner

Primary Examiner—Nabil El-Hady
(74) Attorney, Agent, or Firm—Oliff & Berridge, PLC

(57) ABSTRACT

For each page set contained in a hypertext and with reference to access history information, a hyperlink transition frequency acquiring unit calculates a transition frequency between the pages (i.e., a hyperlink) of the page set. An attribute extracting unit extracts an attribute from each page in the hypertext. In a correlation analyzing unit there is calculated a correlation between the transition frequency of the hyperlink and the attribute. When a predetermined page set is given as an object of analysis, the attribute extracting unit extracts an attribute, and in an attribute analyzing unit the attribute is compared with a multiple regression expression stored in a correlation data storing unit. The resulting correlation expression is displayed in a display unit. According to this configuration it is possible to show a cause of a problem involved in the page configuration of a hypertext system, present a remedial measure, and improve the page configuration easily.

15 Claims, 15 Drawing Sheets

FIG.2

| HYPERLINK {STARTING PAGE, LINKED PAGE} | TRANSITION FREQUENCY | LINK POSITION | LINK SIZE | PAGE SIZE |
|---|---|---|---|---|
| {P1, P2} | 0.13 | 56 | 8 | 305 |
| {P1, P3} | 0.43 | 15 | 7 | 305 |
| {P1, P4} | 0.02 | 268 | 3 | 305 |
| {P2, P4} | 0.65 | 10 | 25 | 521 |
| {P2, P5} | 0.11 | 46 | 2 | 521 |
| {P3, P2} | 0.04 | 121 | 18 | 11 |
| ... | ... | ... | ... | ... |

HYPERTEXT ANALYZING SYSTEM AND METHOD

BACKGROUND OF THE INVENTION

1. Field of the Invention

The present invention relates to a technique for improving a portion which involves a problem in point of configuration in a hypertext system configuration on a network.

2. Description of the Prior Art

In a hypertext system (e.g., World Wide Web, hereinafter referred to simply as "Web") configured on a network, an access history of each user (visitor) can be recorded in a server which stores a hypertext. In the access history are usually included an identifier (IP address in case of utilizing the internet) of a computer used by the accessed user, accessed time, and an identifier (URL in Web) on the server of the accessed page (file).

As a technique for analyzing both access history and hyperlink structure and acquiring a knowledge which permits judging whether the configuration of a hypertext system (e.g., Web site) is superior or inferior, there is known [Perkowitz and Etzioni, 98] (Perkowitz and Etzioni, Adaptive Web Sites: Automatically Syntherizing Web Pages, in Proc. of AAAI-98).

According to the technique of [Perkowitz and Etzioni, 98], first, with respect to all of page sets on a site, an access co-occurrence frequency from the same user is calculated and page sets exceeding a predetermined threshold value are allowed to remain, while the other page sets are discarded. Further, from among the remaining page sets, those actually coupled by hyperlinks are discarded. Then, the still remaining page sets are regarded as a graph coupled with arcs. The graph is then analyzed to extract a clique (a complete graph with all nodes coupled through arcs). A page group which constitutes the clique is not connected with hyperlinks correlated (strongly) with each other, it is possible to understand that an inferior portion on the site could be found out. According to this technique, despite a strong tendency to making access at the same session by many users, it is possible to find out a page group free of hyperlink therebetween (therefore each user will be asked to make much effort for page-to-page transition).

According to the prior art it is possible to show explicitly a page group inferior in configuration, but it has been impossible to analyze the cause of a problem involved in the page group. Therefore, it has been required for the hypertext administrator concerned to find out a page group remedying method by trial and error. This method involves modifying a certain portion, collecting access histories for a while, measuring the effect of improvement, and repeating these operations. During these operations, the configuration of the hypertext system becomes unstable, giving rise to the problem that users making repeated access are confused. Further, since the method for improving a page group in a hypertext system depends on the object, scale, function, and layout of the hypertext system, as well as topics and user type, it is necessary to grasp features of the hypertext system concerned.

SUMMARY OF THE INVENTION

The present invention has been accomplished in view of the abovementioned circumstances and provides a hypertext analyzing method involving pre-calculating a correlation between various attributes extracted from page contents and a page-to-page transition frequency with respect to an arbitrary page set on a hypertext system concerned and showing which attribute should be modified and how it should be modified for improving the configuration with respect to a portion which includes configurational problem on the hypertext system.

For implementing the above method, according to the first aspect of the present invention there is provided a hypertext analyzing system including a hyperlink transition frequency acquiring unit for analyzing access history information on the access to a hypertext system, also analyzing a hyperlink structure, and calculating a hyperlink transition frequency between pages (e.g., all pages) linked together by a hyperlink, an attribute extracting unit for extracting (one or more) attributes from the contents of a page set linked by a hyperlink, a correlation analyzing unit for calculating a correlation between the hyperlink transition frequency and the attributes, a correlation data storing unit for storing data obtained by the correlation analyzing unit, an attribute analyzing unit for comparing attributes which have been extracted, using the attribute extracting unit, from the contents (e.g., one) designated page set with the correlation data stored in the correlation data storing unit and thereby acquiring information on which attribute should be modified, to what degree it should be modified, and what effect will be obtained thereby, on the assumption that the hyperlink transition frequency between the pages of the page set is to be changed (generally for the purpose of increase), and a display unit for displaying the result obtained by the attribute analyzing unit.

In this configuration, it is possible to easily show which attribute should be changed for obtaining a desired transition frequency between pages which have been correlated with each other using a hyperlink in designer's expectation of user transition. An administrator of a hyperlink system, e.g., Web system, can build and maintain a desired Web system by changing attributes of Web pages on the basis of the contents thus presented.

According to the second aspect of the present invention there is provided a hypertext analyzing system including a hyperlink transition frequency acquiring unit for analyzing access history information on the access to a hypertext system, also analyzing a hyperlink structure, and calculating a hyperlink transition frequency between pages (e.g., all pages) linked together by a hyperlink, an attribute extracting unit for extracting (one or more) attributes from the contents of a page set linked by a hyperlink, a correlation analyzing unit for calculating a correlation between the hyperlink transition frequency and the attributes, a correlation data storing unit for storing data obtained by the correlation analyzing unit, a to-be-analyzed page set acquiring unit for calculating, using the hyperlink transition frequency acquiring unit, a hyperlink transition frequency between pages (e.g. all pages) linked together by a hyperlink in a designated page group and acquiring a page set (e.g., one or more) of a small hyperlink transition frequency, an attribute analyzing unit for comparing attributes which have been extracted, using the attribute extracting unit, from the contents of the page set acquired by the to-be-analyzed page set acquiring unit with the correlation data stored in the correlation data storing unit and thereby acquiring information on which attribute should be modified, to what degree it should be modified, and what effect will be obtained thereby, on the assumption that the hyperlink transition frequency between the pages of the page set is to be changed (generally for the purpose of increase), and a display unit for displaying the result obtained by the attribute analyzing unit.

Also in this configuration, it is possible to easily show what attribute should be changed for obtaining a desired transition frequency between pages which have been correlated with each other, and it is possible to build and maintain a desired hyperlink system, e.g., Web system. In addition, pages small in transition frequency despite of being linked by a hyperlink can be picked out automatically as an object to be modified.

According to the third aspect of the present invention there is provided a hypertext analyzing system including a hyperlink transition frequency acquiring unit for analyzing access history information on the access to a hypertext system, also analyzing a hyperlink structure, and calculating a hyperlink transition frequency between pages (e.g., all pages) linked together by a hyperlink, attribute extracting unit for extracting (one or more) attributes from the contents of a page set linked by a hyperlink, a correlation analyzing unit for calculating a correlation between the hyperlink transition frequency and the attributes, a correlation data storing unit for storing data obtained by the correlation analyzing unit, a to-be-analyzed page set acquiring unit for calculating, using the hyperlink transition frequency acquiring unit, a hyperlink transition frequency between pages (e.g., all pages) linked together by a hyperlink in a designated page group, further calculating a contents similarity between the pages with use of the attribute extracting unit, and on the basis of a ratio between the hyperlink transition frequency and the contents similarity, acquiring a page set (e.g., one or more) which is small in the hyperlink transition frequency despite of being similar in contents, an attribute analyzing unit for comparing attributes which have been extracted, using the attribute extracting unit, from the contents of the page set acquired by the to-be-analyzed page set acquiring unit with the correlation data stored in the correlation data storing unit and thereby acquiring information on which attribute should be modified, to what degree it should be modified, and what effect will be obtained thereby, on the assumption that the hyperlink transition frequency between the pages of the page set is to be changed (generally for the purpose of increase), and a display unit for displaying the result obtained by the attribute analyzing unit.

In this configuration, it is possible to easily show which attribute should be changed for obtaining a desired transition frequency between pages which have been correlated with each other using a hyperlink, and it is possible to build and maintain a desired hyperlink system, e.g., Web system. In addition, pages linked by a hyperlink and small in transition frequency despite of having associated contents can be picked out automatically.

According to the fourth aspect of the present invention there is provided a hypertext analyzing system including an access similarity analyzing unit for analyzing access history information on each of (e.g., all) page sets which constitute a hypertext system and thereby calculating a page-to-page access similarity which represents the degree of access made to both pages of the page set concerned by (many) users, an attribute extracting unit for extracting (one or more) attributes from the contents of the page set or from a hypertext which contains the page set, a correlation analyzing unit for calculating a correlation between the page-to-page access similarity and the attributes, a correlation data storing unit for storing data obtained by the correlation analyzing unit, an attribute analyzing unit for comparing attributes which have been extracted, using the attribute extracting unit, from the contents of a designated (e.g., one) page set or from a hypertext structure containing the page set with the correlation data stored in the correlation data storing unit and thereby acquiring information on which attribute should be modified, to what degree it should be modified, and what effect will be obtained thereby, on the assumption that the page-to-page access similarity in the page set is to be changed (generally for the purpose of increase), and a display unit for displaying the result obtained by the attribute analyzing unit.

In this configuration, it is possible to easily show which attribute should be changed for obtaining a desired transition frequency between pages not linked by a link, and it is possible to build and maintain a desired hyperlink system, e.g., Web system.

According to the fifth aspect of the present invention there is provided a hypertext analyzing system including an access similarity analyzing unit for analyzing access history information on each of (e.g., all) page sets which constitute a hypertext system and thereby calculating a page-to-page access similarity which represents the degree of access made to both pages of the page set concerned by (many) users, an attribute extracting unit for extracting (one or more) attributes from the contents of the page set or from a hypertext which contains the page set, a correlation analyzing unit for calculating a correlation between the page-to-page access similarity and the attributes, a correlation data storing unit for storing data obtained by the correlation analyzing unit, a to-be-analyzed page set acquiring unit for calculating, using the access similarity analyzing unit, a page-to-page access similarity between arbitrary pages in a designated page group and acquiring a page set (one or more) small in the page-to-page access similarity, an attribute analyzing unit for comparing attributes which have been extracted, using the attribute extracting unit, from the contents of the page set acquired by the to-be-analyzed page set acquiring unit or from a hypertext structure which contains the page set with the correlation data stored in the correlation data storing unit and thereby acquiring information on which attribute should be modified, to what degree it should be modified, and what effect will be obtained thereby, on the assumption that the page-to-page access similarity between the pages of the page set is to be changed (generally for the purpose of increase), and a display unit for displaying the result obtained by the attribute analyzing unit.

Also in this configuration it is possible to easily show which attribute should be changed for obtaining a desired transition frequency between pages which are not directly linked by a link, and it is possible to build and maintain a desired hyperlink system, e.g., Web system. Further, pages with little co-occurrence of access by users can be picked out automatically as an object of modification.

According to the sixth aspect of the present invention there is provided a hypertext analyzing system including an access similarity analyzing unit for analyzing access history information on each of (e.g., all) page sets which constitute a hypertext system and thereby calculating a page-to-page access similarity which represents the degree of access made to both pages of the page set concerned by (many) users, an attribute extracting unit for extracting (one or more) attributes from the contents of the page set or from a hypertext which contains the page set, a correlation analyzing unit for calculating a correlation between the page-to-page access similarity and the attributes, a correlation data storing unit for storing data obtained by the correlation analyzing unit, a to-be-analyzed page set acquiring unit for calculating, using the access similarity analyzing unit, a page-to-page access similarity between arbitrary pages in a designated page group, further calculating a contents similarity between the pages with use of the attribute extracting unit, and on the basis of a ratio between the page-to-page access similarity and the contents similarity, acquiring a page set (one or more) which is small in the page-to-page access similarity despite of being similar in contents, an attribute analyzing unit for comparing attributes which have been extracted, using the attribute extracting unit, from the contents of the page set acquired to the to-be-analyzed page set acquiring unit or from a hypertext structure which contains the page set with the correlation data stored in the correlation data storing unit and thereby acquiring information on which attribute should be modified, to what degree it should be modified, and what effect will be obtained thereby, on the assumption that the page-to-page access similarity in the page set is to be changed (generally for the purpose of increase), and a display unit for displaying the result obtained by the attribute analyzing unit.

Also in this configuration it is possible to show which attribute should be changed for obtaining a desired transition frequency between pages which are not directly linked by a link, and it is possible to build and maintain a desired hyperlink system, e.g., Web system. Further, pages with little co-occurrence of user access despite of associated contents can be picked out automatically as an object of modification.

In the first to sixth aspects of the present invention, the attribute extracting unit may extract, as one of attributes, at least the position of a hyperlink in page contents, at least the number of hyperlinks in page contents, at least the type of a hyperlink in page contents, at least the size of a hyperlink in page contents, at least the type of a character which represents a hyperlink in page contents, or at least the size of a page in page contents.

In the first, second, fourth, or fifth aspect of the present invention, the attribute extracting unit may extract, as one of attributes, at least the contents similarity between pages of a page set.

In the first to sixth aspects of the present invention, the attribute extracting unit may extract, as one of attributes, at least the position of a page or at least data and time of page update.

In the fourth to sixth aspects of the present invention, the attribute extracting unit may extract the number of hyperlink transitions between pages as one of attributes.

In the first to third aspects of the present invention, the hyperlink transition frequency analyzing unit may identify a search robot which makes access to hypertexts in a comprehensive manner and collects information automatically, and make analysis exclusive of access information provided from the search robot.

In the fourth to sixth aspects of the present invention, the access similarity analyzing unit may identify a search robot which makes access to hypertexts in a comprehensive manner and collects information automatically, and make analysis exclusive of access information provided from the search robot.

In the first to third aspects of the present invention, the hyperlink transition frequency analyzing unit may identify a proxy server and make analysis exclusive of access information provided from the proxy server.

In the fourth to sixth aspects of the present invention, the access similarity analyzing unit may identify a proxy server and make analysis exclusive of access information provided from the proxy server.

In the first to third aspects of the present invention, the hyperlink transition frequency analyzing unit may make analysis exclusive of a hyperlink transition with a page large in linked number as a link destination.

According to the seventh aspect of the present invention there is provided a hypertext analyzing system including a hyperlink transition frequency acquiring unit for analyzing access history information on the access to a hypertext system, also analyzing a hyperlink structure, and calculating a hyperlink transition frequency between pages (e.g., all pages) linked by a hyperlink, an attribute extracting unit for extracting (one or more) attributes from the contents of a page set linked by a hyperlink a correlation analyzing unit for calculating a correlation between the hyperlink transition frequency and the attributes, a correlation data storing unit for storing data obtained by the correlation analyzing unit, an attribute analyzing unit for comparing attributes which have been extracted, using the attribute extracting unit, from the contents of a designated (e.g., one) page set with the correlation data stored in the correlation data storing unit and thereby acquiring information on which attribute should be modified, to what degree it should be modified, and what effect will be obtained thereby, on the assumption that the page-to-page hyperlink transition frequency is to be changed (generally for the purpose of increase), a display unit for displaying the result obtained by the attribute analyzing unit, an editing unit for modifying the contents of the designated page set while making reference to the displayed result, and a contents modification effect analyzing unit for comparing attributes which have been extracted, using the attribute extracting unit, from the contents modified by the editing unit with the correlation data stored in the correlation data storing unit, thereby predicting the page-to-page hyperlink transition frequency between the pages of the page set, and calculating a modification effect, the result obtained by the contents modification effect analyzing unit being displayed in the display unit.

In this configuration it is possible to easily show which attribute should be changed for obtaining a desired transition frequency between pages associated with each other using a hyperlink. In addition, it is possible to make the adjustment of attribute surely on the basis of a predictive result after the attribute adjustment and hence possible to build and maintain a desired hyperlink system, e.g., Web system.

According to the eighth aspect of the present invention there is provided a hypertext analyzing system including an access similarity analyzing unit for analyzing access history information on each of (e.g., all) page sets which constitute a hypertext system and thereby calculating a page-to-page access similarity which represents the degree of access made to both pages of the page set concerned by (many) users, an attribute extracting unit for extracting (one or more) attributes from the contents of the page set or from a hypertext which contains the page set, a correlation analyzing unit for calculating a correlation between the page-to-page access similarity and the attributes, a correlation data storing unit for storing data obtained by the correlation analyzing unit, an attribute analyzing unit for comparing attributes which have been extracted, using the attribute extracting unit, from the contents of a designated (e.g., one) page set or from a hypertext structure containing the page set with the correlation data stored in the correlation data storing unit and thereby acquiring information on which attribute should be modified, to what degree it should be modified, and what effect will be obtained thereby, on the assumption that the page-to-page access similarity in the page set is to be changed (generally for the purpose of increase), a display unit for displaying the result obtained by the attribute analyzing unit, an editing unit for modifying the contents of the designated page set while making reference to the displayed result, and a contents modification effect analyzing unit for comparing attributes which have been extracted, using the attribute extracting unit, from the contents modified in the editing unit with the correlation data stored in the correlation data storing unit, thereby predicting the page-to-page access similarity, and calculating a modification effect, the result obtained by the contents modification effect analyzing unit being displayed in the display unit.

In this configuration it is possible to easily show which attribute should be changed for obtaining a desired transition frequency between pages not directly linked by a link. In addition, it is possible to make the adjustment of attribute surely on the basis of a predictive result after the attribute adjustment and hence possible to build and maintain a desired hyperlink system, e.g., Web system.

In the first to sixth aspects of the present invention, the correlation analyzing unit may have a function of selecting attributes not considered to be effective at the time of calculating a correlation between the hyperlink transition frequency and attributes (or between the access similarity and attributes) and such attributes may be ignored in the processing which follows.

In the first to sixth aspects of the present invention, there may be used a to-be-analyzed object designating unit for designating (e.g., via a network) a hypertext system to be analyzed.

In the first to sixth aspects of the present invention, there may be used a to-be-analyzed object designating unit whereby plural users designate (e.g., via a network) a hypertext system to be analyzed.

In the first to sixth aspects of the present invention, there may be used a contents transmitting unit for delivery and receipt (e.g., via a network) of the contents of a hypertext system to be analyzed.

In the first to sixth aspects of the present invention, there may be used a contents transmitting unit for delivery and receipt (e.g., via a network) of the contents of a hypertext system to be analyzed to and from plural users.

In the first to sixth aspects of the present invention, there may be used an access history information transmitting unit for delivery and receipt (e.g., via a network) of access history information of a hypertext system to be analyzed.

In the first to sixth aspects of the present invention, there may be used an access history information transmitting unit for delivery and receipt (e.g., via a network) of access history information of a hypertext system to be analyzed to and from plural users.

In the first to sixth aspects of the present invention, there may be used an attribute designating unit for designating (e.g., via a network) a tuple of attributes extracted by the attribute extracting unit.

In the first to sixth aspects of the present invention, there may be used an attribute designating unit whereby plural users designate (e.g., via a network) a tuple of attributes extracted by the attribute extracting unit.

In the seventh aspect of the present invention, the editing unit may be configured so that it can be operated via a network or can be operated by plural users via a network.

In the first to sixth aspects of the present invention, the display unit may be configured so that it can transmit display contents via a network or can transmit display contents to plural users via a network.

The present invention can also be realized in the form of a hypertext analyzing method. In this case, the method is constructed with a procedure corresponding to each of the unit which constitute the hypertext analyzing system. At least a part of the configuration of the present invention may be implemented as a computer software. The present invention can also be implemented by a recording medium with such computer software recorded therein.

BRIEF DESCRIPTION OF THE DRAWINGS

Preferred embodiments of the present invention will be described in detail with reference to the accompanying drawings, wherein:

FIG. 2 shows an example of attribute in the embodiment;

DETAILED DESCRIPTION OF THE PREFERRED EMBODIMENTS

It is Web that is typical among hypertext systems built on a network. Embodiments of the present invention will be described in detail hereunder while making reference, as an example, to Web described in HTML (HyperText Markup Language).

[Embodiment 1]

Figure 1:
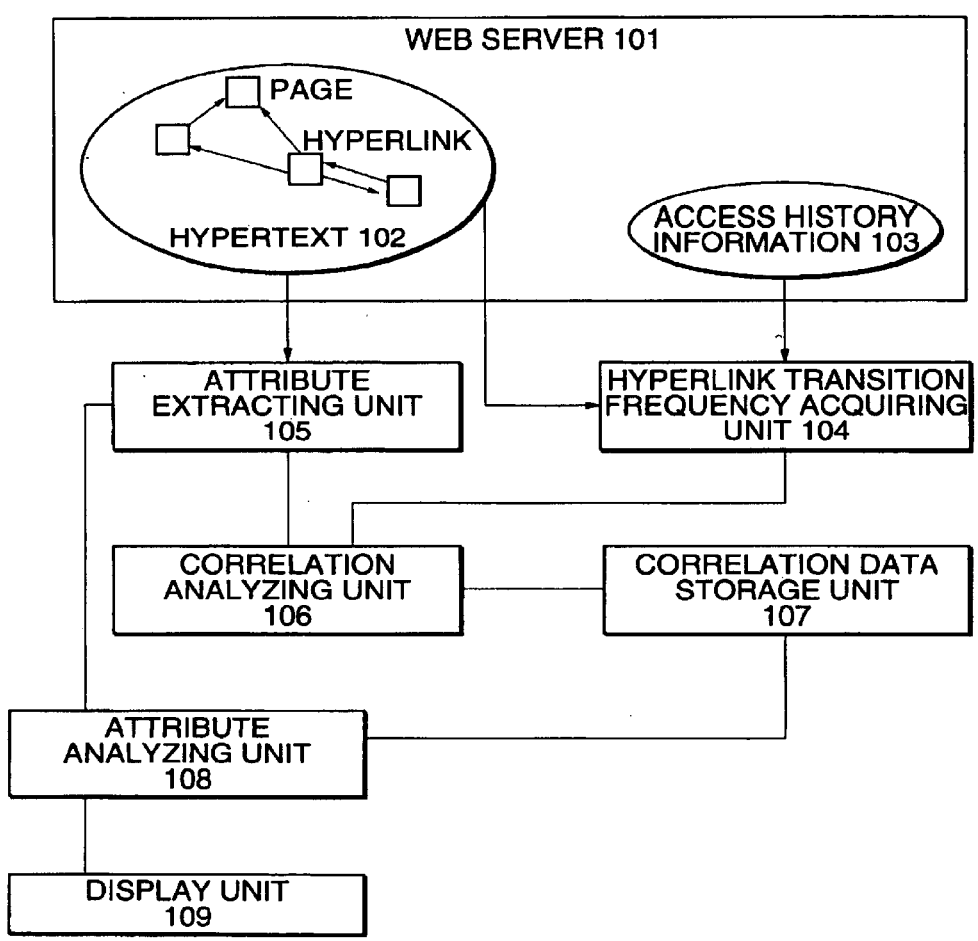
FIG. 1 is a block diagram showing a configuration of an embodiment of the present invention.

FIG. 1 is a block diagram showing Embodiment 1 of the present invention. In the same figure, a Web server 101 transmits information on a network. In the Web server 101 there is stored information to be offered to users, as a hypertext 102 which is made up of pages (files) and hyperlinks. A user can acquire information by making access to the hypertext 102 on the Web server 101. The Web server has a function which, at every access from a user, records a computer identifier (IP address) for identifying the user computer, an access time, and an address (URL) where there is a page accessed by the user, as access history information 103.

A hyperlink transition frequency acquiring unit 104 acquires pages (only those present on the Web server 101 are checked and those present outside the Web server are ignored) liked from each page (called a starting page) in the hypertext 102. Then, with respect to each of the page sets thus acquired, the hyperlink transition frequency acquiring unit 104 makes reference to the access history information 103 and, if there is access successively from a starting page to a linked page from the same user and at the same session, counts the access as one case (this can be implemented easily by arranging accessed pages (URL) in order of time for each IP address and within a certain time range). An integrated count obtained is a page-to-page transition frequency (i.e., of the hyperlink). As a modification of the present invention, a value obtained by dividing the integrated count by the number of accesses to the starting page may be handled as a hyperlink transition frequency. There may be made another modification such that the hyperlink transition frequency acquiring unit 104 ignores access from a search robot which is for the collection of information. For example, this can be realized by identifying the search robot according to whether there is access to a special page (in Web, a file named—robots.txt which is placed just under a root directory) to which access is made by the search robot in accordance with a certain custom, whether there is a behavior of accessing a large number of pages comprehensively in a short time which is characteristic of the search robot, and whether the computer identifier concerned is of a known search robot, and by excluding information on the computer identifier of the search robot. By so doing, the hyperlink transition frequency reflects the behavior of an actual user (a human) more accurately, so that the accuracy of the hypertext analyzing system in question is improved. There may be adopted another modification wherein the hyperlink transition frequency acquiring unit 104 ignores access from a proxy server. This is done for solving the following problem. Among computer identifiers included in the access history information 103, those corresponding to the proxy server are (generally) intensive of accesses from plural users, so even if a hyperlink transition frequency thereof is obtained, it is not an accurate reflection of the behavior of each individual user and thus the analysis accuracy is deteriorated. Whether the server concerned is a proxy server or not can be determined according to whether access has been made, within a certain period, to pages the number of which exceeds a predetermined threshold value (such an access frequency as is usually not accessed by an individual is used as the threshold value) or whether the computer identifier concerned is of a known proxy server or not. There may be adopted a further modification wherein the hyperlink transition frequency acquiring unit 104 analyzes the hyperlink structure of the hypertext 103, then determines the number of links associated with each page, and ignores the hyperlink transition to a page wherein the value obtained exceeds a predetermined threshold value. Pages large in linking number or linked number are in many cases index pages for site navigation. Rather than pages including contents which the contents provider at the site wants the users to access, there is a strong tendency that the pages in question are for fulfilling a functional role to retain the performance of the site. Even if a hyperlink transition frequency with those pages as link destinations is obtained, this does not directly lead to a direct quantitization of the behavior of a user searching for contents. Therefore, by ignoring the hyperlink transition with those pages as link destinations, the analysis accuracy is improved and the amount of calculation decreases, thus leading to an improvement of the processing efficiency.

An attribute extracting unit 105 extracts (one or more) attributes from each page in the hypertext 102. As the attributes, there is extracted a combination of N number (N is 1 to 9) of items selected from the following nine items. Of course, there may be used other attributes.

[Attribute 1]

The positions of hyperlinks corresponding to liked pages in page contents are extracted. This can be implemented by obtaining information on which character from the head of page contents it is that corresponds to the hyperlink embedded position (this can be determined by character counting), or information on which word from the head of page contents it is that corresponds to the hyperlink embedded position (this can be implemented by using an existing morpheme analyzing technique), or information on which paragraph from the head of page contents it is that corresponds to the hyperlink embedded position (this can be implemented by using tag information). As a modification in the present invention, the position of a hyperlink may be established as a position within a window frame when the page concerned is subjected to rendering by a browser and is displayed. To be more specific, a standard window frame size is preset and it is extracted whether a hyperlink will be displayed within the window frame, or the window frame is equally divided into three vertically like (upper portion, middle portion, lower portion, invisible portion) and it is extracted to which area the hyperlink belongs. As another modification, the position of a hyperlink may be established by showing in what order the hyperlink concerned appears among all the hyperlinks included in the page contents.

[Attribute 2]

The number of hyperlinks in page contents is extracted. As a modification, the number may be the number of hyperlinks pointing to a specific page (a noted linked page). This can be counted easily by extracting hyperlinks from all the pages in the hypertext 102 and checking their linked URL.

[Attribute 3]

Extraction is made as to whether hyperlinks in page contents are represented by text or by image. This can be realized by taking out tags indicative of hyperlinks from page contents (<A HREF=URL> . . . </A>) and it is checked whether image files are embedded therein (<A HREF=URL><IMG SRC=GRAPHIC FILE . . . ></A>).

[Attribute 4]

The hyperlink size in page contents is extracted. As a measure of size there is used, for example, the number of characters or words in case of a text (this can be implemented by using an existing morpheme analyzing technique), or the area of a display region in case of an image (this is determined by multiplying the value of width by the value of height in IMG tag).

[Attribute 5]

The character type of a hyperlink text in page contents is extracted. As the character type there is extracted, for example, font size, font color, or whether a character decoration such as Italic or bold print is present or not. These are defined by tags and so can be extracted easily.

[Attribute 6]

The size of page is extracted. As a measure of the size there is used, for example, the number of characters or words of contents (this can be implemented by using an existing morpheme analyzing technique), or the size (bytes) of a page file.

[Attribute 7]

A contents similarity between a starting page and a linked page is extracted. A conventional method is used for calculating the contents similarity. For example, in a vector space model method [Salton and Allan, 1994] (Salton and Allan, Text Retrieval Using the Vector Processing Model, in Proc.

of SDAIR-94.), there is generated, for each page, such a vector as uses a word as a term and its occurrence frequency as the value of the term, and an inner product value between vectors is used as the contents similarity. As a modification in the present invention the calculation may cover only words that occur in a vicinal text (by the term "vicinal" is meant, for example, the same paragraph or N words in front and in the rear) near the position where the hyperlink of each starting page is embedded (as to a linked page, words which occur in the whole of the page are covered, or if an intra-page position of a link destination is described in the hyperlink, the associated vicinal text is covered).

[Attribute 8]

A logical position difference between pages is extracted. For example, the position of a directory where a page file is placed on the Web server 101 is regarded as a logical position and the depth from a root is extracted. Next, the difference in depth between a starting page and a linked page is calculated and the value obtained is used as a logical position difference (the depth from the root can be determined by analyzing URL; for example, if the starting page is a file named Page1.html and is represented by such URL as www.OO.co.jp/Dir1/Page1.html and if the linked page is a file named Page2.html and is represented by such URL as www.OO.co.jp/Dir1/Dir2/ Page2.html, a logical position difference is 1).

[Attribute 9]

Page file updating date and time are checked (the date and time of updating can be known by checking the file property in Web server 101) and a difference time between the time when the hypertext analyzing system according to the present invention is used and the updating time is extracted as an attribute.

FIG. 2 is a part of a table showing hyperlink transition frequencies obtained by the hyperlink transition frequency acquiring unit 104 and attributes obtained by the attribute extracting unit 105. In this example, as the hyperlink transition frequency there is used a value obtained by dividing an integrated count by the number of accesses to each starting page, and as a combination of attributes there is used a combination of three attributes which are the foregoing 1 (counted number of words from the head), 4 (the number of characters), and 6 (the number of words in each starting page).

In a correlation analyzing unit 106 shown in FIG. 1, there is calculated a correlation between the hyperlink transition frequency obtained in the hyperlink transition frequency acquiring unit 104 and the attributes obtained in the attribute extracting unit 105. As a correlation calculating method there may be adopted a conventional statistical method, but here a description will be given of an example of using a multiple regression analysis. In case of applying multiple regression analysis to the present invention, a dependent variable is a hyperlink transition frequency (assumed to be y) and an independent variable is each attribute (assumed to be $x_1, x_2, x_3, \ldots, x_p$) (in the example of FIG. 2, a dependent variable is the transition frequency (y), while independent variables are the following three—link position ($x_1$), like size ($x_2$), and page size ($x_3$)—. In the multiple regression analysis there is prepared a multiple regression equation of $y=a_1x_1+a_2x_2+a_3x_3+ \ldots +a_px_p+a_0$ (a is a regression coefficient) and data are substituted into y and x in the left and right sides, respectively to afford an equation which represents a square of the difference. Generally, since there are plural (multiple) data series, there are obtained, for all of them, expressions each representing a square of a difference between the left and right sides and then the sum (assumed to be Q) of all the equations is obtained. Subsequently, a procedure is taken to determine such a regression coefficient as minimizes Q (this can be done by partially differentiating Q by each regression coefficient to prepare an equation with the resulting value set to 0 and by solving the associated simultaneous equations). The multiple regression expression thus obtained is stored in a correlation data storing unit 107 shown in FIG. 1. There may be adopted a modification wherein attributes not considered effective for the estimation of a dependent variable (hyperlink transition frequency) are selected from among independent variable candidates and are ignored in the processing which follows, thereby improving the analysis accuracy and processing efficiency. In the multiple regression analysis, methods are known for selecting a combination of effective independent variables. For example, a forward selection method and a stepwise method have been proposed (Carl J. Huberty, Applied Discriminant Analysis, John Wiley & Sons, Inc., 1994). In the present invention, the calculation in question can be effected easily by using any of such proposed methods.

Next, once a certain pair of pages is given as an object to be analyzed, the attribute extracting unit 105 in the hypertext analyzing system extracts attributes in the above manner. (Only the attributes adopted above as predictor variables may be extracted. In the example of FIG. 2, the foregoing three attributes of 1, 4 and 6 are extracted). The attributes thus obtained are compared in the attribute analyzing unit 108 with the multiple regression equation stored in the correlation data storing unit 107. To be more specific, attention is paid to a certain attribute (e.g., the foregoing attribute 1 in the example of FIG. 2) and the values of the other attributes are substituted into the multiple regression equation (the values of the foregoing attributes 4 and 6 are substituted into $x_2$ and $x_3$, respectively. As a result, the regression equation is represented as a single variable linear equation ($y=a_1x_1+c$ (c is a constant)). Since there is obtained a (predictive) correlation equation of the hyperlink transition frequency of the given page set and the noted attribute, it is predicted to what value the attribute is to be changed (on the premise that the other attributes are not changed) and how the hyperlink transition frequency is changed thereby. Substitution of the noted attribute value (obtained in the attribute extracting unit 105) affords a current estimated value of hyperlink transition frequency. In the present invention, the noted attribute referred to above is not specially designated, but the above processing is repeated while taking note of all the attributes one by one (i.e., there are obtained correlation equations in a number corresponding to the number of attributes).

Figure 3:
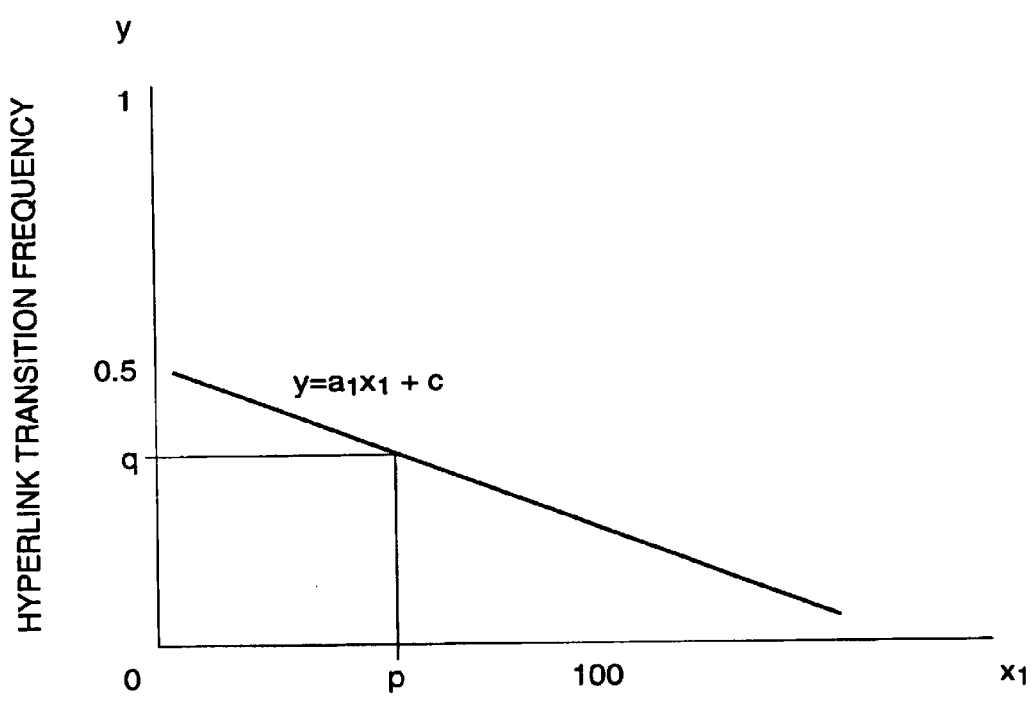
FIG. 3 shows an example of display in the embodiment.

The correlation equation thus obtained is displayed on the display unit 109. FIG. 3 shows an example of display, which is a part of the display obtained in the example of FIG. 2, taking note of the foregoing attribute 1. In the same figure, the hyperlink transition frequency of the given page set is expressed as a (linear) function of the noted attribute (the position of the hyperlink). In FIG. 3, the value p on x-axis indicates a current attribute value, while the value q ($=a_1p+c$) on y-axis indicates a current estimated value of the hyperlink transition frequency. By reference to FIG. 3 it can be predicted quantitatively to what degree the attribute value should be changed (in this example, in which word the hyperlink position should be embedded) and to what degree the hyperlink transition frequency can be changed thereby (generally, increasing the hyperlink transition frequency is considered effective, but in this example it can be predicted that the more front the hyperlink position, the higher the hyperlink transition efficiency, the effect of which depends on the value of the regression coefficient $a_1$).

[Embodiment 2]

Embodiment 2 of the present invention will be described below.

Figure 4:
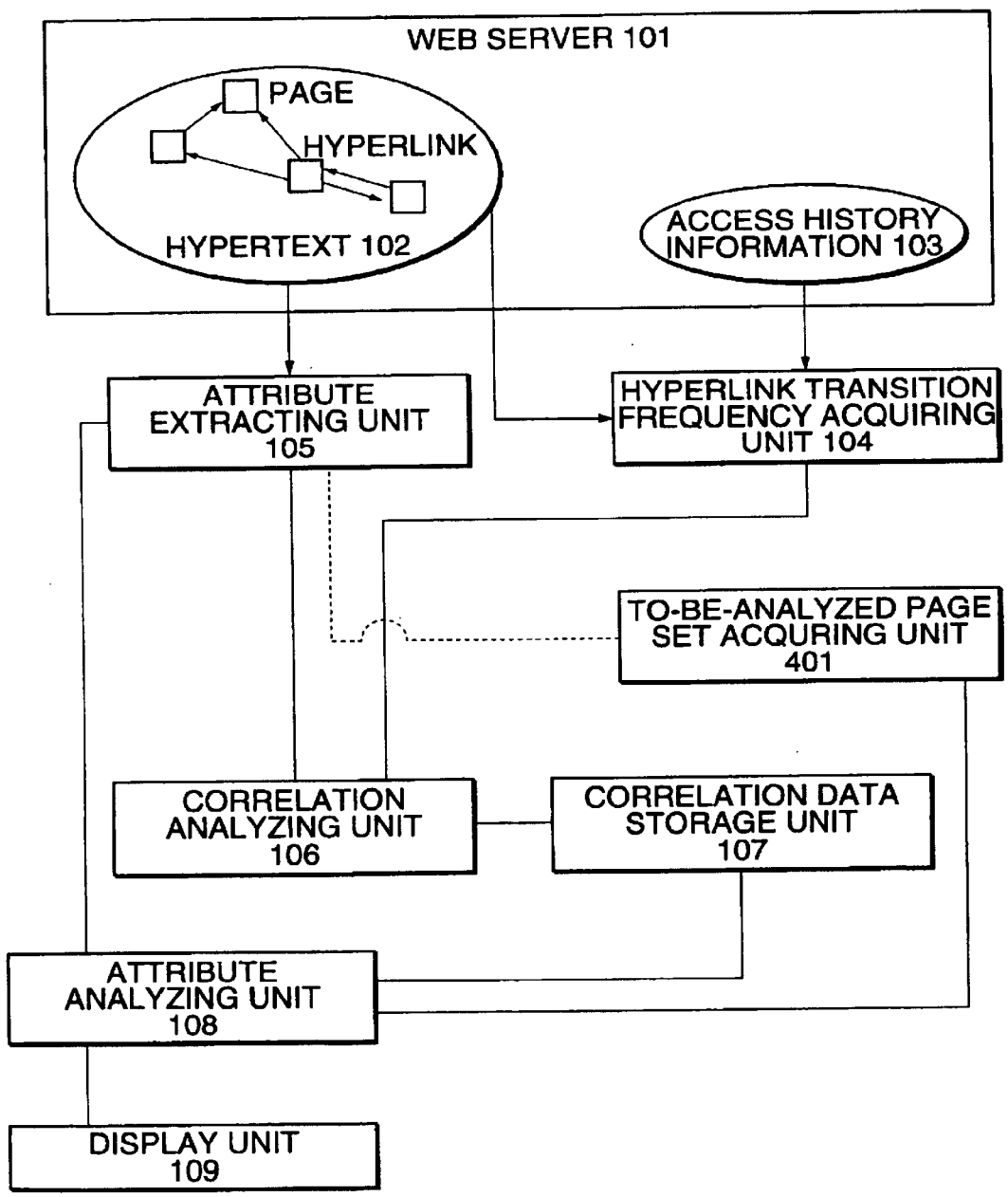
FIG. 4 is a block diagram showing a configuration of another embodiment of the present invention.

FIG. 4 is a block diagram showing Embodiment 2 of the present invention. In this embodiment, the same portions as in the above embodiment are identified by the same reference numerals as in the above embodiment and tautological explanations will be omitted. In this Embodiment 2, page sets to be analyzed by the attribute analyzing unit 108 are selected automatically by a to-be-analyzed page set acquiring unit 401. This processing flows as follows. First, hyperlink transition frequencies are obtained by the hyperlink transition frequency acquiring unit 104 with respect to page sets linked directly by hyperlinks among designated pages (e.g., all pages on a certain specific server or all pages present below a certain specific directory on a certain specific server). This information is delivered to the to-be-analyzed page set acquiring unit 401, which in turn acquires page sets smaller than a preset threshold value and delivers them to attribute analyzing unit 108. The attribute analyzing unit 108 analyzes the received page sets (in order) in accordance with the method described in the previous embodiment. By so doing it is possible to omit the time and labor required for a user of the hypertext analyzing system to search for and designate a page set which is likely to involve a problem (in its hyperlink transition frequency).

Reference will here be made to a modification. First, in the same way as the above processing, hyperlink transition frequencies are obtained by the hyperlink transition frequency acquiring unit 104 with respect to page sets linked directly by hyperlinks out of designated pages. Further, in this modification, page-to-page contents similarities are obtained by the foregoing method in the attribute extracting unit 105 with respect to the page sets. Information on the thus-obtained page-to-page hyperlink transition similarities and contents similarities is delivered to the to-be-analyzed page set acquiring unit 401, which in turn acquires page sets wherein values obtained by dividing the hyperlink transition frequencies by the contents similarities are smaller than a preset threshold value and delivers them to the attribute analyzing unit 108. The page sets smaller in such divided values are similar in contents, but the transition of links by users is not so likely to occur, and thus it can be said that there is room for improvement (a guideline for the improvement is obtained in the attribute analyzing unit 108 as in the foregoing and is displayed in the display unit 109).

[Embodiment 3]

Embodiment 3 of the present invention will be described below.

Figure 5:
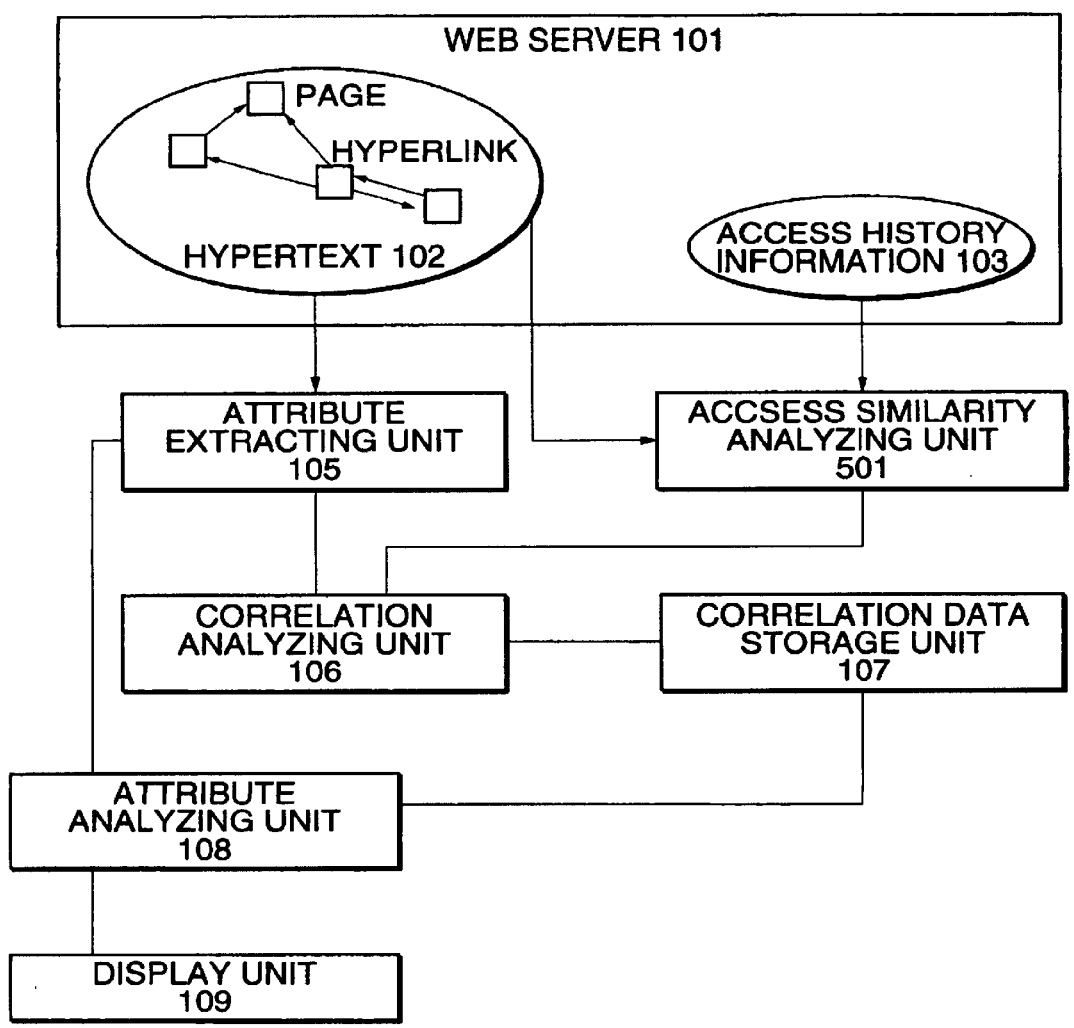
FIG. 5 is a block diagram showing a configuration of a further embodiment of the present invention.

FIG. 5 is a block diagram illustrating Embodiment 3. In this embodiment, the same portions as in the previous embodiments are identified by the same reference numerals as in the previous embodiments and tautological explanations will be omitted. In the same figure, an access similarity analyzing unit 501 obtains page-to-page access similarities with respect to (all) page sets contained in a hypertext 102. By the term "access similarity" is meant an index which represents how many users have accessed both pages of each page set. For example, using the vector space model method, there is prepared such a vector as involves accessed IP address as a term and its occurrence frequency as the value of the term, with respect to each page, and an inner product value between such vectors is used as the access similarity. Thus, by using the access similarity instead of the foregoing hyperlink transition frequency, it becomes possible to present a page configuration remedying measure for an arbitrary page set (without considering whether a hyperlink is present between two pages). There may be adopted a modification wherein the access similarity analyzing unit 501 ignores access from an information collecting search robot in the same way as in the previous embodiments. There also may be adopted another modification wherein the access similarity analyzing unit 501 ignores access from a proxy server in the same manner as in the previous embodiments.

The attribute extracting unit 105 performs the same processing as in the previous embodiments, but in this Embodiment 3, the number of hyperlink transitions between pages may be calculated and used as one of attributes. More specifically, when a page set [page A, page B] is given, the number of transitions in the shortest path from page A to page B is calculated, then the number of transitions in the shortest path from page B to page A is calculated, while taking hyperlink directions into account, then both are compared with each other and the smaller one is assumed to be the number of hyperlink transitions in the page set [path A, path B]. The shortest path from page A to page B can be determined by search for hyperlinks while counting depths (the number of transitions) with priority put on width until page B is reached from page A. Generally, this search is continued until there no longer is any hyperlink capable of being traced. But, for increasing the processing efficiency, a setting may be made so that the search stops when the depth (the number of transitions) has reached a predetermined threshold value. In this case, the number of transitions in the shortest page-to-page path is assumed to be the threshold value.

In a correlation analyzing unit 106, a correlation between each access similarity obtained in the access similarity analyzing unit 501 and the attribute obtained in the attribute extracting unit 105 is calculated by a multiple regression analysis in the same way as in the previous embodiments. The resulting multiple regression equation is stored in a correlation data storing unit 107. There may be adopted a modification wherein, by the same method as in the previous embodiments, attributes not considered effective in the prediction of a dependent variable (access similarity) are selected from among independent variable candidates and are ignored in the processing which follows, thereby increasing the analysis accuracy and improving the processing efficiency.

Next, when a certain page pair is given as an object to be analyzed, the attribute extracting unit 105 in the hypertext analyzing system extracts an attribute in the same way as in the previous embodiments. Then, in attribute analyzing unit 108, the attributes thus obtained are compared with the multiple regression equation stored in the correlation data storing unit 107, and there is obtained a (predictive) correlation equation between the access similarity of the given page pair and the noted attribute in the same manner as in the previous embodiments. Therefore, it is predicted to what value the attribute should be changed and how the hyperlink transition frequency will be changed thereby (on the premise that the other attributes are not changed). Substitution of the value of the noted attribute (the one obtained by the attribute extracting unit 105) affords an estimated value of the current access similarity. The noted attribute referred to above is not specially designated, but the above processing is repeated while taking note of all the attributes in order (i.e., there are obtained correlation equations in a number corresponding to the number of attributes). The correlation equations thus obtained are displayed in the display unit 109.

[Embodiment 4]

Embodiment 4 of the present invention will be described below.

Figure 6:
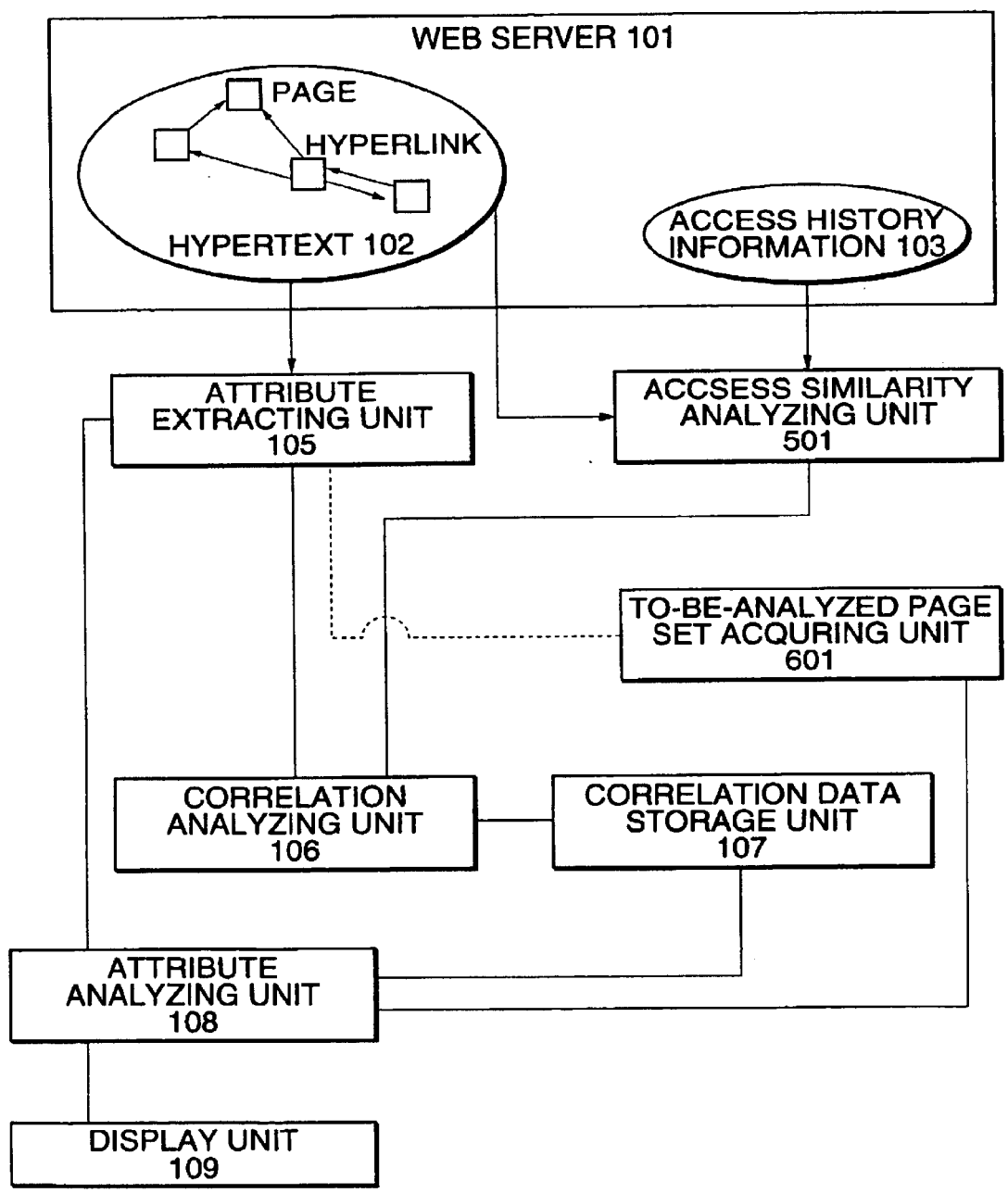
FIG. 6 is a block diagram showing a configuration of a still further embodiment of the present invention.

FIG. 6 is a block diagram showing Embodiment 4 of the present invention. In Embodiment 4, the same portions as in the previous embodiments are identified by the same reference numerals as in the previous embodiments and tautological explanations will be omitted. According to this embodiment, page sets to be analyzed in an attribute analyzing unit 108 are selected automatically by a to-be-analyzed page set acquiring unit 601. The processing flows as follows. First, any two pages are taken out as a page set from designated pages (e.g., all pages on a certain specific server or all pages present below a certain specific directory on a certain specific server), and an access similarity thereof is obtained using an access similarity analyzing unit 501. Next, this information is delivered to the to-be-analyzed page set acquiring unit 601, which in turn acquires page sets smaller in access similarity than a predetermined threshold value and delivers them to the attribute analyzing unit 108. The attribute analyzing unit 108 analyzes the received page sets (in order) in accordance with the method described in the previous embodiments. By so doing it is possible to omit the time and labor required for users of the hypertext analyzing system to search for and designated a page set which is likely to involve a problem (in access similarity).

Reference will now be made to a modification. First, in the same manner as the above processing, access similarities are obtained by the access similarity analyzing unit 501 with respect to page sets each of two arbitrary pages taken out from designated pages. Further, page-to-page contents similarities are obtained by the foregoing method. Information on the page-to-page access similarities and contents similarities thus obtained are delivered to the to-be-analyzed page set acquiring unit 601, which in turn acquires page sets wherein values obtained by dividing the access similarities by the contents similarities are smaller than a predetermined threshold value and delivers them to the attribute acquiring unit 108. The page sets smaller in such divided values are similar in contents, but the transition of links by users is not so likely to occur, and thus it can be said that there is room for improvement (a guideline for the improvement is obtained in the attribute analyzing unit 108 as in the foregoing and is displayed in the display unit 109).

[Embodiment 5]

Embodiment 5 of the present invention will be described below.

Figure 7:
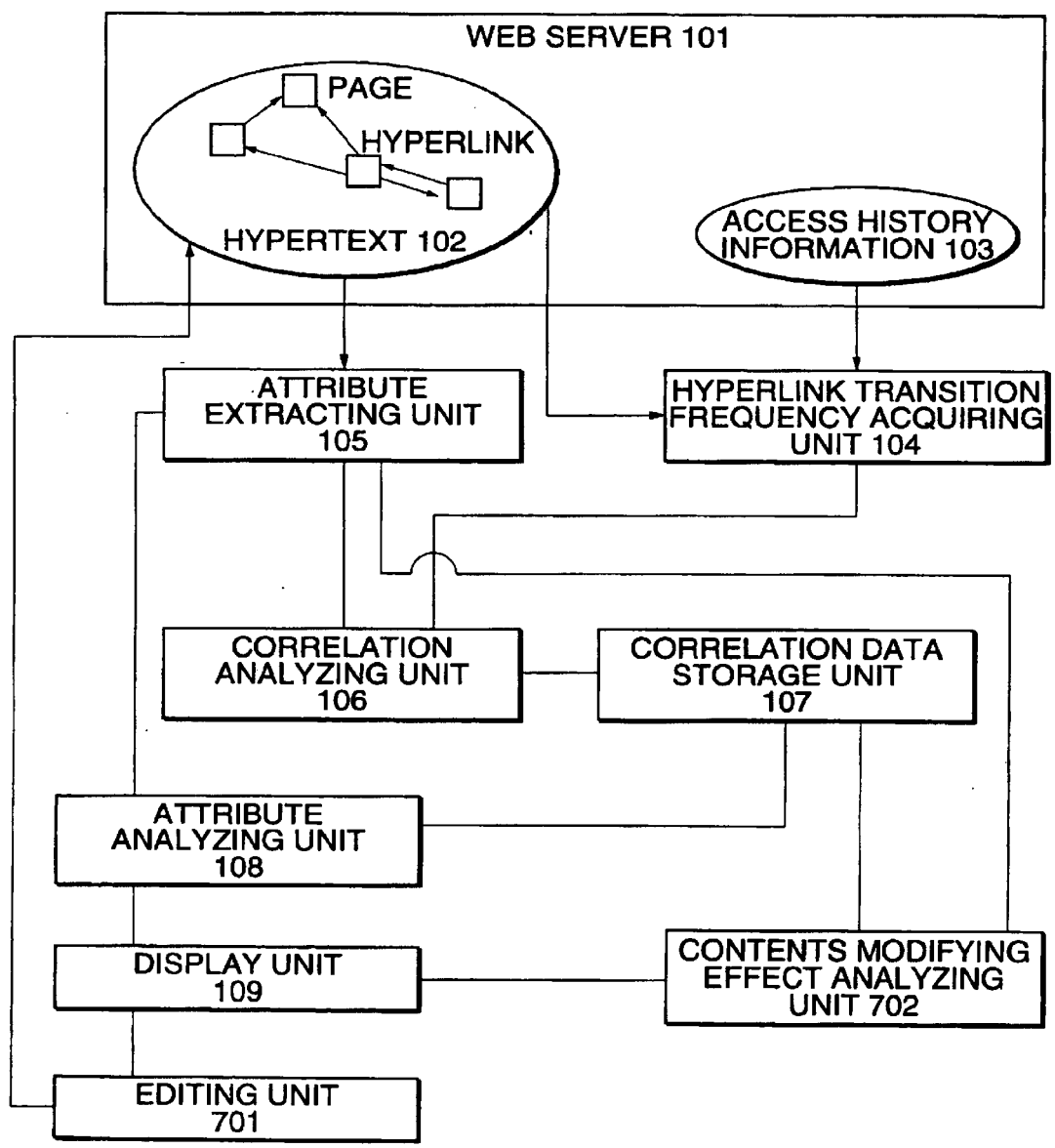
FIG. 7 is a block diagram showing a configuration of a still further embodiment of the present invention.

FIG. 7 is a block diagram illustrating Embodiment 5. In this embodiment, the same portions as in the previous embodiments are identified by the same reference numerals and tautological explanations will be omitted. A hyperlink transition frequency acquiring unit 104 shown in the same figure may be replaced by an access similarity analyzing unit 501. In this case, the hyperlink transition similarity in the following description is replaced by an access similarity.

Figure 8:
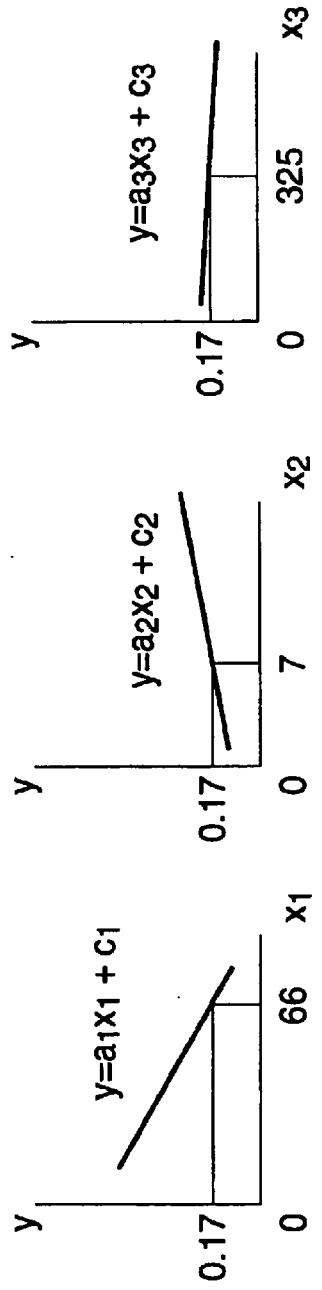
FIG. 8 shows an example of display in the embodiment.

According to this embodiment, in an editing unit 701, an operator of this hypertext analyzing system can modify the contents (one or more attributes) of a designated page set while making reference to information (information on which attribute should be changed, to what degree it should be changed, and what effect will be obtained, on the assumption that the page-to-page hyperlink transition frequency in the designated page set is to be changed) displayed in a display unit 109. FIG. 8 shows an example of display in the display unit 109. In this example, P6 (starting page) and P7 (linked page) correspond to the designated page set, and as the hyperlink transition frequency corresponding to a dependent variable y there is used a value obtained by dividing an integrated count by the number of accesses to the starting page (in case of substitution by an access similarity there is used an inner product value between vectors based on the occurrence frequency of IP address as in the previous embodiments). In connection with a combination of attributes there are used three attributes, which are the foregoing 1 (hyperlink position, using a word count from the head), 4 (hyperlink size, using the number of characters), and 6 (page size, using the number of words in the starting page). These attributes correspond to independent variables $x_1$, $x_2$, and $x_3$, respectively. From the table of FIG. 8 it is seen that the values of the three attributes extracted from the page set {P6, P7} (by attribute extracting unit 105) are $x_1=66$, $x_2=7$, and $x_3=325$, respectively, and that an estimated hyperlink transition frequency is $y=0.17$ (determined in attribute analyzing unit 108). If the estimated hyperlink transition frequency value of $y=0.17$ is to be increased, the operator can become aware, upon look at the three graphs shown in the lower portion of the same figure, what attribute should be changed, to what degree it should be changed, and what effect will be obtained thereby. In this example it is seen that the estimated hyperlink transition frequency value is increased by making $x_1$ small (i.e., the hyperlink position from P6 to P7 is shifted to the front), or by making $x_2$ large (i.e., the number of characters in hyperlink from P6 to P7 is increased), or by making $x_3$ small (i.e., decreasing the number of characters in P6). At this time, a look at the inclination of each graph easily shows what effect a variable quantity of each attribute value has (the three graphs represent estimated hyperlink transition frequency values obtained by changing only the respective corresponding attributes). With reference to these information pieces, the operator can modify the contents of the page set {P6, P7} in the editing unit 701. The thus-modified page set is placed in a hypertext 102.

In the attribute extracting unit 105, the attributes of the page set are extracted in the same way as in the previous embodiments and are delivered to a contents modification effect analyzing unit 702. Using the same method as in the previous embodiments, the contents modification effect analyzing unit 702 compares the attributes of the page set with the correlation data stored in correlation data storing unit 107, thereby predicts a hyperlink transition frequency between the pages of the page set, calculates an effect based on the modification, and delivers the result of the calculation to the display unit 109.

Figure 9:
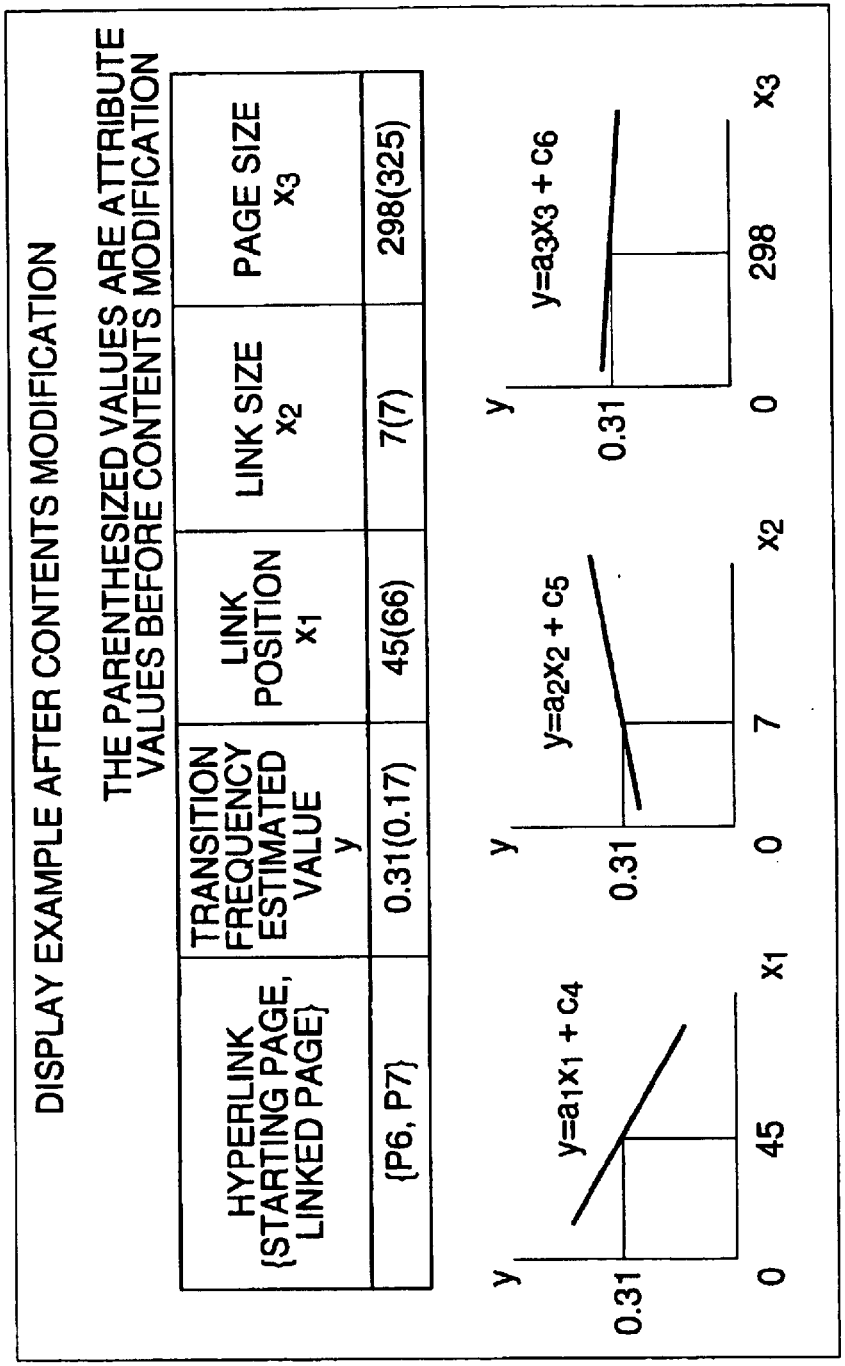
FIG. 9 also shows an example of display in the embodiment.

FIG. 9 shows an example of display in the display unit 109 and the table of the same figure shows an estimated hyperlink transition frequency value after contents modification of the page set {P6, P7}. In this example, the operator causes $x_1$ and $x_3$ to change in the editing unit 701 and the estimated hyperlink transition frequency value after the modification increases from 0.17 to 0.31. The operator can repeat the contents modification with use of the editing unit 701 while making reference to this display example. At this time, as described above, the operator can become aware what attribute should be changed, to what degree it should be changed, and what effect will be obtained, by looking at the three graphs shown in the lower portion of the same figure. These three graphs are in such a shape as regression coefficients $a_1$, $a_2$, and $a_3$ being the same with only constant terms changed in comparison with those before the contents modification.

[Embodiment 6]

Embodiment 6 of the present invention will be described below.

Figure 10:
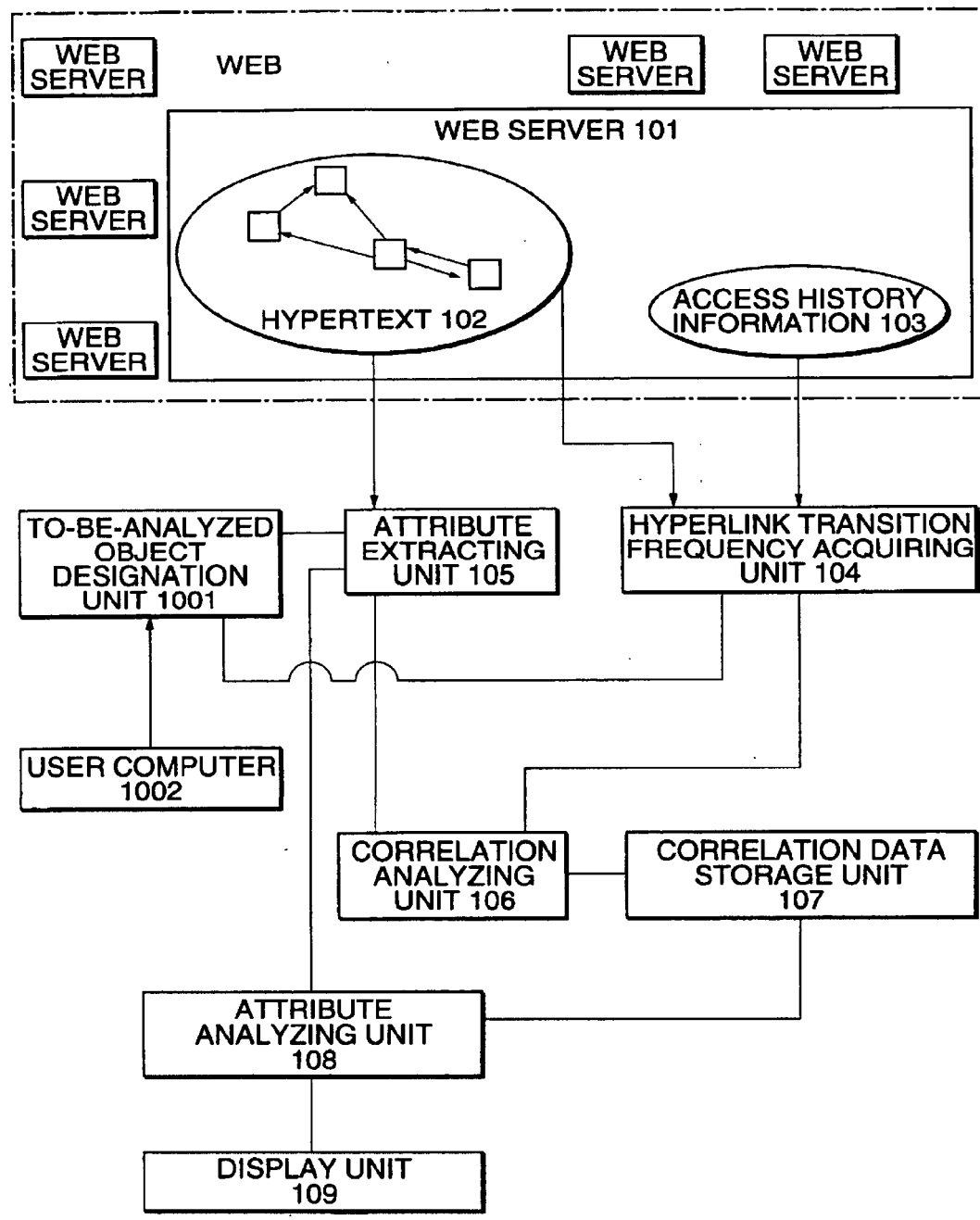
FIG. 10 is a block diagram showing a configuration of a still further embodiment of the present invention.

FIG. 10 is a block diagram showing Embodiment 6. In this embodiment, the same portions as in the previous embodiments are identified by the same reference numerals as in the previous embodiments and tautological explanations will be omitted. According to this embodiment there is used to-be-analyzed object designating unit 1001 whereby it is made possible for users of the hypertext analyzing system to designate a Web server to be analyzed. A user computer 1002 and the to-be-analyzed object designating unit 1001 are connected together through a network (e.g., internet or telephone line). A URL (anything will do insofar as it is a server identifying mark) of the Web server to be analyzed is inputted to the user computer 1002, which in turn delivers it to the to-be-analyzed object designating unit 1001 through the network. The to-be-analyzed object designating unit 1001 delivers the URL to both attribute extracting unit 105 and hyperlink transition frequency acquiring unit 104 (or access similarity analyzing unit 501). The attribute extracting unit 105 and the hyperlink transition frequency acquiring unit 104 issue the URL in accordance with HTTP (HyperText Transfer Protocol), then make access to the Web server to be analyzed, and acquire necessary information. There may be adopted a modification wherein the to-be-analyzed object designating unit 1001 is connected to the computers 1002 of plural users. In this case, the to-be-analyzed object designating unit 1001 has each individual user input user ID (or both user ID and password) thereto and makes control so as to avoid interference among individual processings, with use of a conventional data base access control technique. Another modification may be adopted wherein the to-be-analyzed object analyzing unit 1001 is put on a Web server and a representation is made as a CGI (Common Gateway Interface) script, thereby permitting the to-be-analyzed object designation in each user computer 1002 to be done by using the form of Web page.

[Embodiment 7]

Embodiment 7 of the present invention will be described below.

Figure 11:
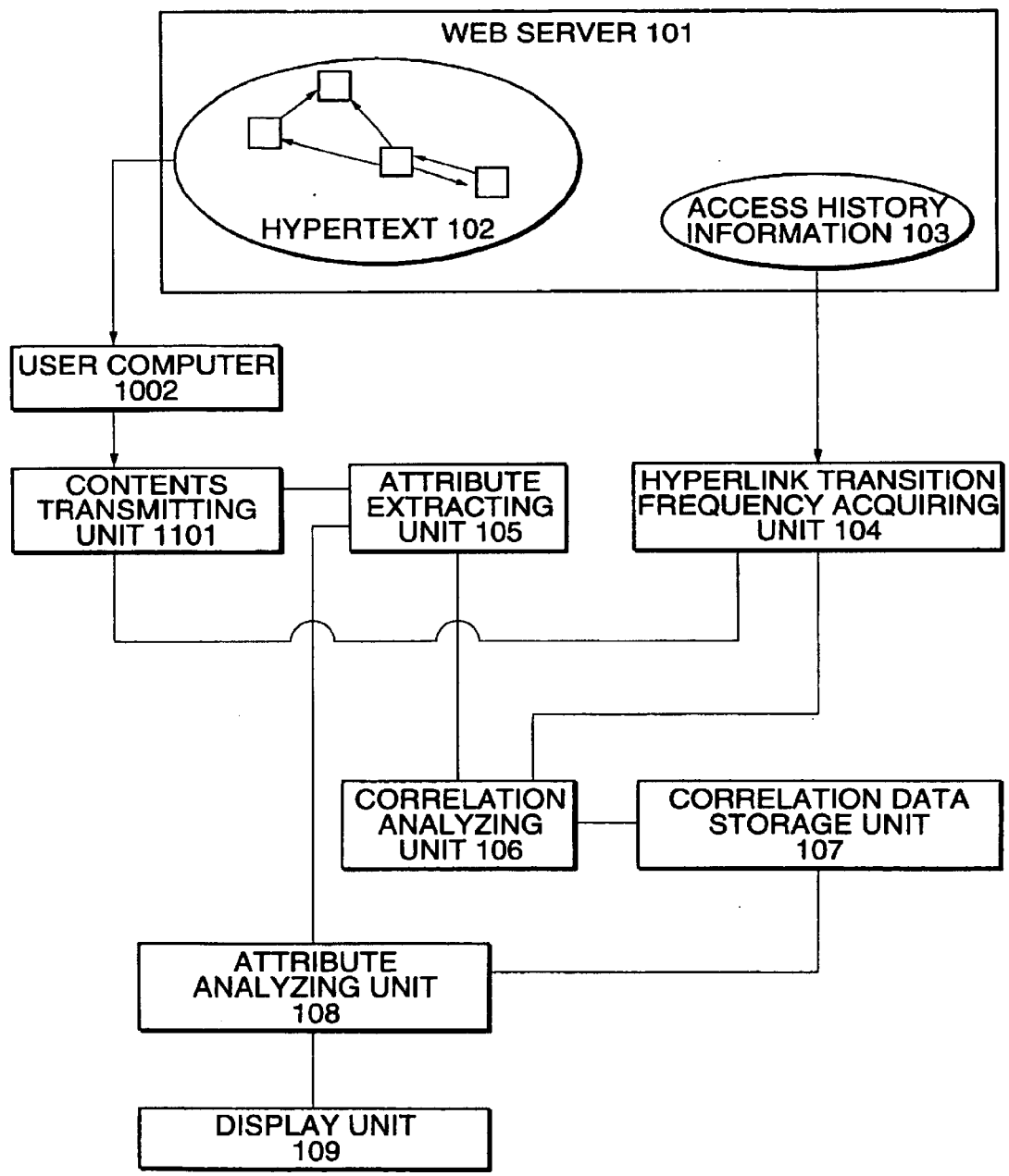
FIG. 11 is a block diagram showing a configuration of a still further embodiment of the present invention.

FIG. 11 is a block diagram showing Embodiment 7. In this embodiment, the same portions as in the previous embodiments are identified by the same reference numerals as in the previous embodiments and tautological explanations will be omitted. According to this embodiment there is used contents transmitting unit 1101 so that users of the hypertext analyzing system can deliver contents present on a Web server as an object of analysis to the hypertext analyzing system. First, contents present on the Web server as an object of analysis are acquired by a user computer 1002 (or the computer possesses such contents beforehand). The user computer 1002 and the contents transmitting unit 1101 are connected together through a network (e.g., internet or telephone line) and the contents of the Web server as an object of analysis are delivered from the user computer 1002 to the contents transmitting unit 1101 through the network. The contents transmitting unit 1101 transmits the contents on the Web server to both attribute extracting unit 105 and hyperlink transition frequency acquiring unit 104 (or access similarity analyzing unit 501). By so doing, although the modification of contents may be frequent in the Web, it is possible to surely effect the analysis of the contents presumed by the user (at the time of thepresumption). A modification may be adopted wherein the contents transmitting unit 1101 is connected to plural users' computers 1002. In this case, the contents transmitting unit 1101 has each individual user input user ID (or both user ID and password) thereto and then makes control so as to avoid interference of individual processing, with use of a conventional data base access control method.

[Embodiment 8]

Embodiment 8 of the present invention will be described below.

Figure 12:
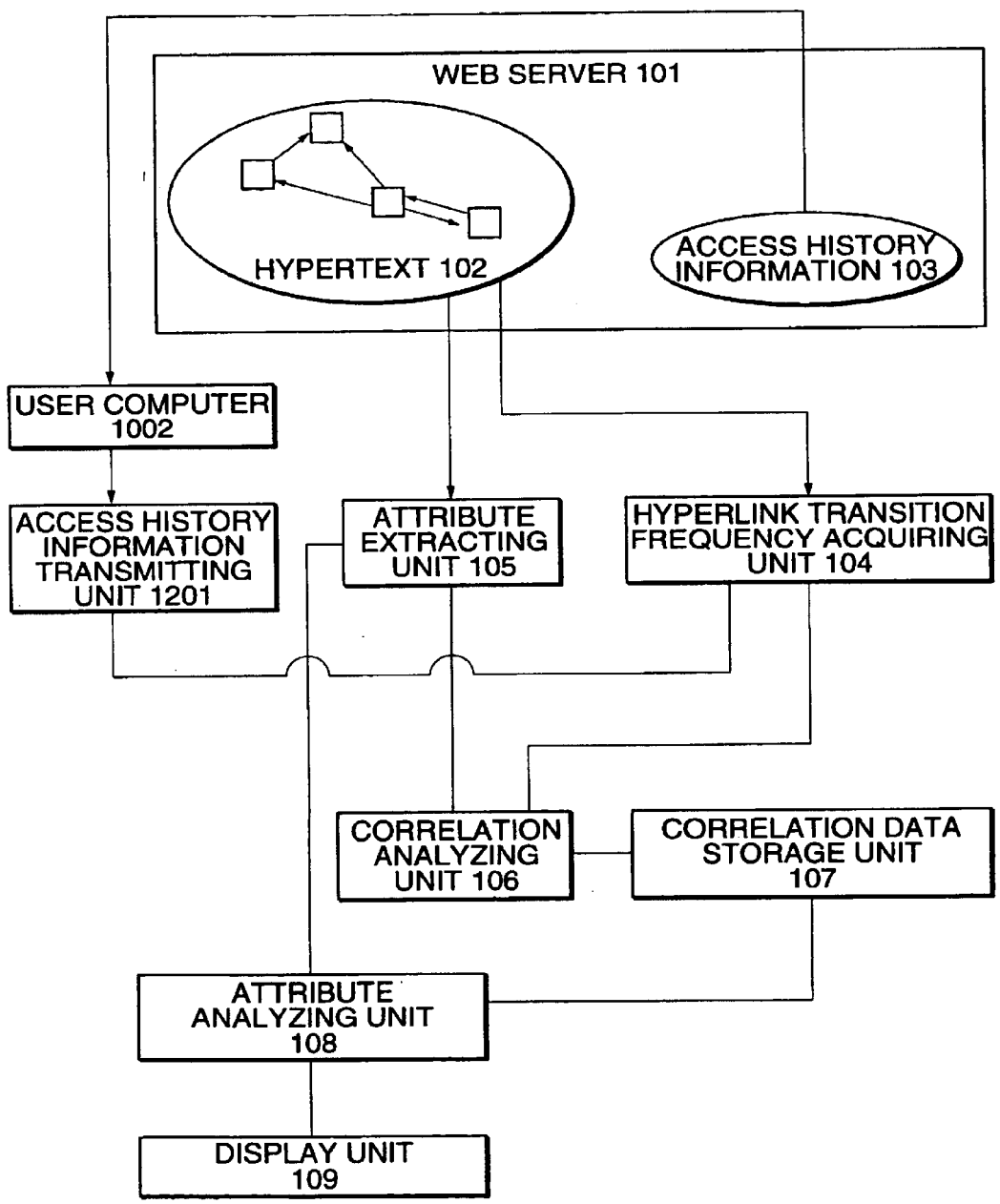
FIG. 12 is a block diagram showing a configuration of a still further embodiment of the present invention.

FIG. 12 is a block diagram showing Embodiment 8. In this embodiment, the same portions as in the previous embodiments are identified by the same reference numerals as in the previous embodiments and tautological explanations will be omitted. According to this embodiment there is used access history information transmitting unit 1201 so that users of the hypertext analyzing system can deliver access history information on a Web server to be analyzed to the hypertext analyzing system. First, access history information of the to-be-analyzed Web server is acquired by a user computer 1002 (or the computer possesses such information beforehand). The user computer 1002 and the access history information transmitting unit 1201 are connected together through a network (e.g., internet or telephone line) and the access history information on the Web server as an object of analysis is delivered to the access history information transmitting unit 1201 through the network. The access history information transmitting unit 1201 transmits the access history information to a hyperlink transition frequency acquiring unit 104 (or an access similarity analyzing unit 501). The access history information on the Web server is highly confidential because it can also be regarded as information on the privacy of an individual. For this reason it is rarely the case that the access history information in question is held in an accessible form on the Web server. If the access history information can be delivered directly between each user and the hypertext analyzing system as in this embodiment, there is little possibility of the access history information being accessed by a third party. A modification may be adopted wherein the access history information transmitting unit 1201 is connected to plural users' computers 1002. In this case, the access history information transmitting unit 1201 has each individual user input user ID (or both user ID and password) thereto and makes control so as to avoid interference among individual processing, with use of a conventional data base access control method.

[Embodiment 9]

Embodiment 9 of the present invention will be described below.

Figure 13:
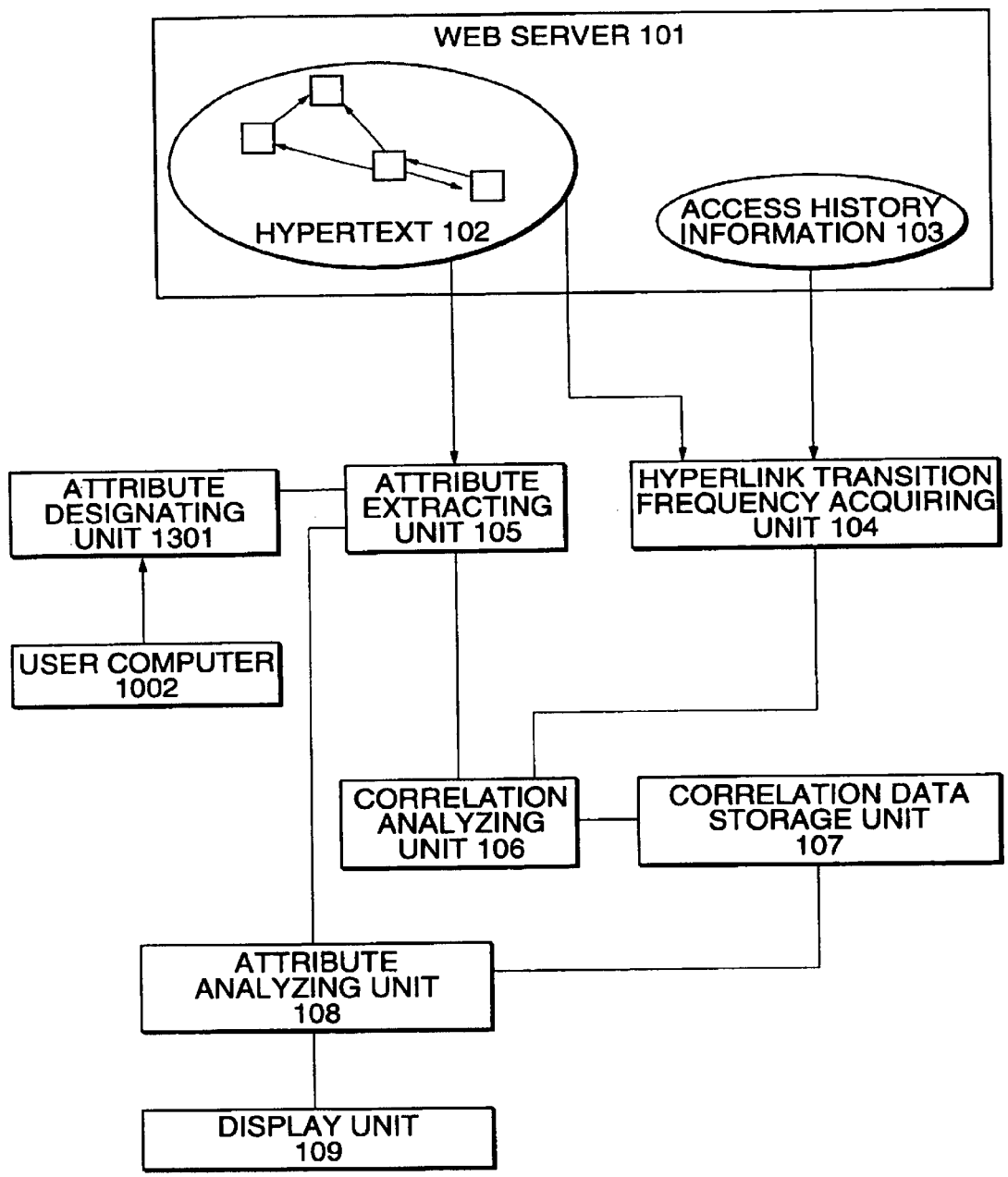
FIG. 13 is a block diagram showing a configuration of a still further embodiment of the present invention.

FIG. 13 is a block diagram showing Embodiment 9. In this embodiment, the same portions as in the previous embodiments are identified by the same reference numerals as in the previous embodiments and tautological explanations will be omitted. According to this embodiment, an attribute designating unit 1301 permits each user of the hypertext analyzing system to designate a combination of attributes to be extracted from the contents of a hypertext to be analyzed. A computer 1002 of the user and the attribute designating unit 1301 are connected together through a network (e.g., internet or telephone line).

A combination of attributes to be extracted is inputted in the user computer 1002 and this information is delivered to the attribute designating unit 1301 through the network. The attribute designating unit 1301 delivers the information to attribute extracting unit 105, which in turn performs processing for the designated combination of attributes as an object to be analyzed. There may be adopted a modification in which the attribute designating unit 1301 is connected to plural users' computers 1002. In this case, the attribute designating unit 1301 has each individual user input user ID (or both user ID and password) and makes control so as to avoid interference among individual processing, with use of a conventional data access control method. A further different modification may be adopted wherein the attribute designating unit 1301 is put a Web server and a representation is made as a CGI script, thereby permitting the designation of an attribute combination in the user computer 1002 to be done by using the form of Web page. In this case, attributes capable of being extracted may be provided as menu in advance so that the user can select attributes on the form.

[Embodiment 10]

Embodiment 10 of the present invention will be described below.

Figure 14:
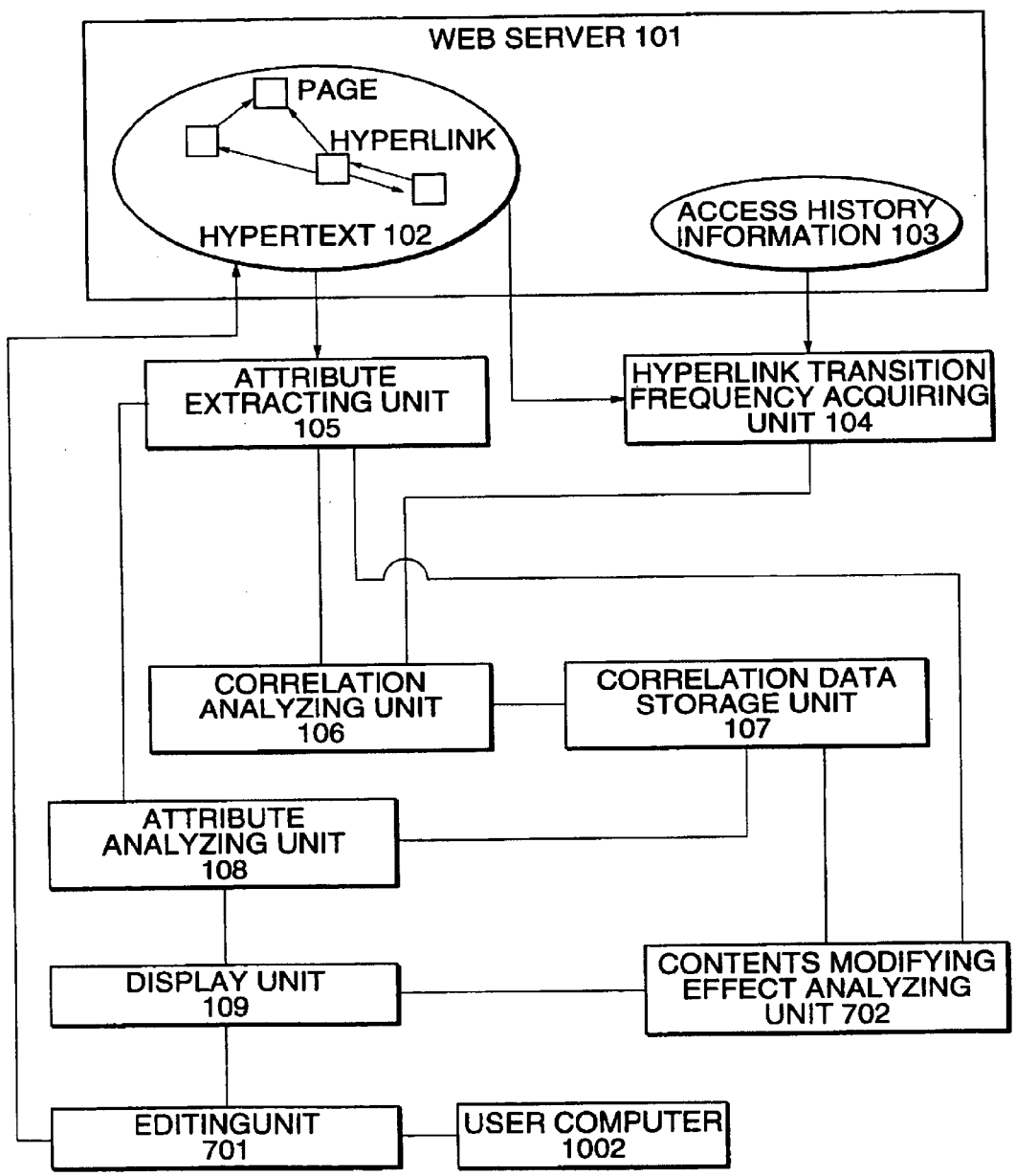
FIG. 14 is a block diagram showing a configuration of a still further embodiment of the present invention.

FIG. 14 is a block diagram showing Embodiment 10. In this embodiment, the same portions as in the previous embodiments are identified by the same reference numerals as in the previous embodiments and tautological explanations will be omitted. According to this embodiment, a user computer 1002 and an editing unit 701 are connected together through a network (e.g., internet or telephone line). An editing work in the user computer 1002 is delivered to the editing unit 701 through the network. There may be adopted a modification wherein the editing unit 701 is connected to plural users' computers 1002. In this case, the editing unit 701 has each individual user input user ID (or both user ID and password) and makes control so as to avoid interference among individual processing, with use of a conventional data base access control method. A further different modification may be adopted wherein the editing unit 701 is put on a Web server and a representation is made as a CGI script, thereby permitting an editing work in the user computer 1002 to be done by using the form of Web page.

[Embodiment 11]

Embodiment 11 of the present invention will be described below.

Figure 15:
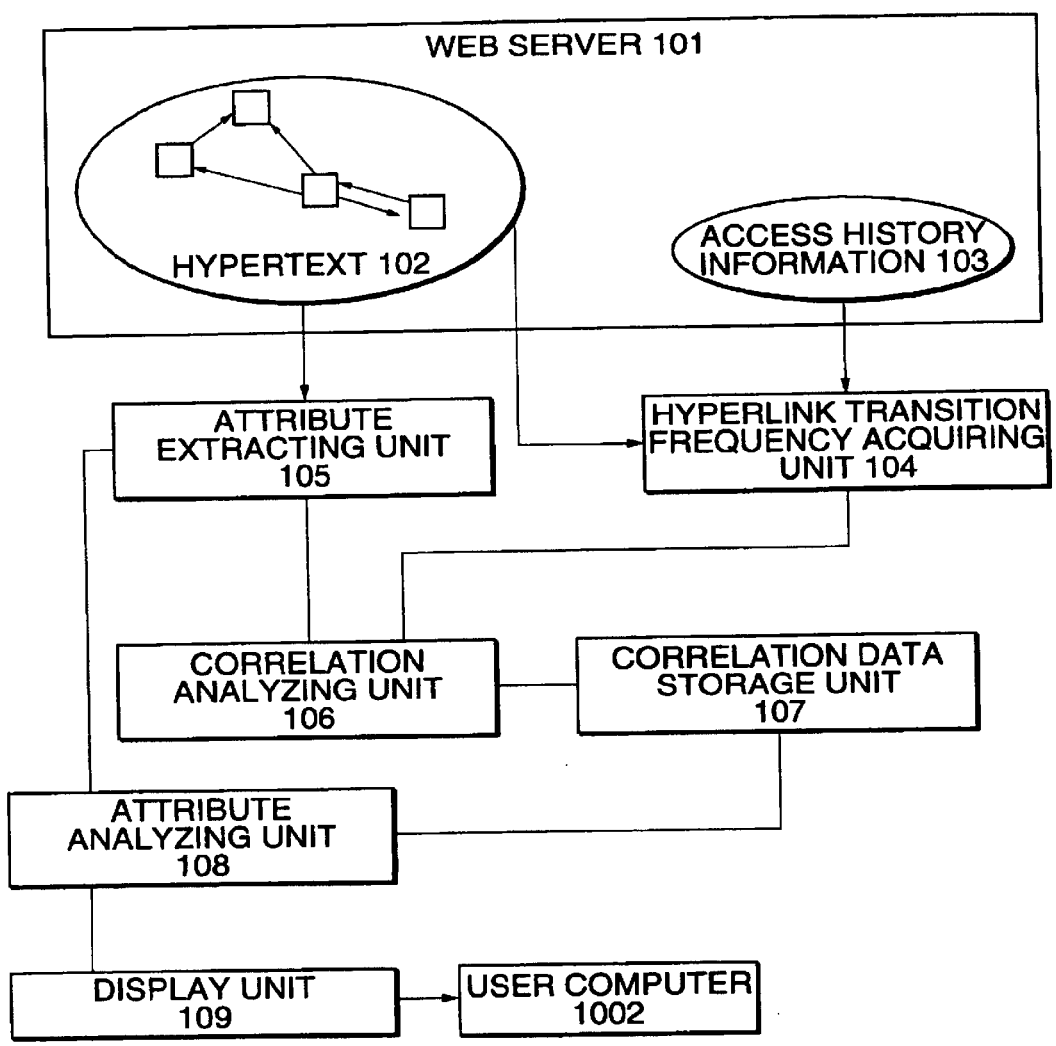
FIG. 15 is a block diagram showing a configuration of a still further embodiment of the present invention.

FIG. 15 is a block diagram showing Embodiment 11. In this embodiment, the same portions as in the previous embodiments are identified by the same reference numerals as in the previous embodiments and tautological explanations will be omitted. According to this embodiment, a user computer 1002 and display unit 109 are connected together through a network (e.g., internet or telephone line). The result of display in the display unit 109 is delivered to the user computer 1002 through the network and is displayed in the user computer. A modification may be adopted wherein the display unit 109 is connected to plural users' computers 1002. In this case, the display unit 109 has each individual user input user ID (or both user ID and password) and makes control so as to avoid interference among individual processing, with use of a conventional data base access control method. There may be adopted a further different modification wherein the display unit 109 is put on a Web server and the result of display is represented in terms of HTML form and is displayed in the user computer 1002.

According to the present invention, as set forth hereinabove, with respect to an arbitrary page set on a Web site and on the basis of a correlation between various attributes extracted from page contents and a page-to-page transition frequency, it is possible to present not only the cause of a problem involved in the page configuration but also a remedial measure for the problem. A hypertext system (Web site) administrator can improve the page configuration easily.

What is claimed is:

1. A hypertext analyzing system comprising:

a hyperlink transition frequency acquiring unit for analyzing access history information on the access to a hypertext system, also analyzing a hyperlink structure, and calculating a hyperlink transition frequency between pages linked together by a hyperlink;

an attribute extracting unit for extracting at least two of a plurality of presentation attributes from a page set linked by a hyperlink;

a correlation analyzing unit for calculating a correlation between the hyperlink transition frequency and each of the at least two attributes;

a correlation data storing unit for storing data obtained by the correlation analyzing unit;

an attribute analyzing unit for comparing the at least two attributes which have been extracted from a designated page set using the correlation data stored in the correlation data storing unit and thereby acquiring information on which attribute should be modified and to what degree the chosen attribute should be modified, and predicting what effect on the hyperlink transition frequency between the pages of the page set will be obtained when the chosen attribute is so modified, on the assumption that the hyperlink transition frequency between the pages of the page set is to be changed; and a display unit for displaying the result obtained by the attribute analyzing unit.

2. A hypertext analyzing system according to claim 1, wherein the correlation analyzing unit has a function of selecting attributes not considered to be effective at the time of calculating a correlation between the hyperlink transition frequency and the attributes, and the thus-selected attributes are ignored in the processing which follows.

3. A hypertext analyzing system according to claim 1, further comprising a to-be-analyzed object designating unit for designating via a network a hypertext system to be analyzed.

4. A hypertext analyzing system comprising:

a hyperlink transition frequency acquiring unit for analyzing access history information on the access to a hypertext system, also analyzing a hyperlink structure, and calculating a hyperlink transition frequency between pages linked together by a hyperlink;

an attribute extracting unit for extracting at least two of a plurality of presentation attributes from a page set linked by a hyperlink;

a correlation analyzing unit for calculating a correlation between the hyperlink transition frequency and each of the at least two attributes;

a correlation data storing unit for storing data obtained by the correlation analyzing unit;

a to-be-analyzed page set acquiring unit for calculating, using the hyperlink transition frequency acquiring unit, a hyperlink transition frequency between pages linked together by a hyperlink in a designated page group and acquiring a smaller page set with a hyperlink transition frequency that falls below a predetermined threshold;

an attribute analyzing unit for comparing the at least two attributes which have been extracted from the page set acquired by the to-be-analyzed page set acquiring unit using the correlation data stored in the correlation data storing unit and thereby acquiring information on which attribute should be modified and to what degree the chosen attribute should be modified, and predicting what effect on the hyperlink transition frequency between the pages of the page set will be obtained when the chosen attribute is so modified, on the assumption that the hyperlink transition frequency between the pages of the page set is to be changed; and a display unit for displaying the result obtained by the attribute analyzing unit.

5. A hypertext analyzing system comprising:

a hyperlink transition frequency acquiring unit for analyzing access history information on the access to a hypertext system, also analyzing a hyperlink structure, and calculating a hyperlink transition frequency between pages linked together by a hyperlink;

an attribute extracting unit for extracting at least two of a plurality of presentation attributes from a page set linked by a hyperlink;

a correlation analyzing unit for calculating a correlation between the hyperlink transition frequency and each of the at least two attributes;

a correlation data storing unit for storing data obtained by the correlation analyzing unit;

a to-be-analyzed page set acquiring unit for calculating, using the hyperlink transition frequency acquiring unit, a hyperlink transition frequency between pages linked together by a hyperlink in a designated page group, and further calculating a content similarity between the pages with use of the attribute extracting unit, and on the basis of a ratio between the hyperlink transition frequency and the content similarity, acquiring a smaller page set with a hyperlink transition frequency that falls below a predetermined threshold despite the pages being similar in content;

an attribute analyzing unit for comparing the at least two attributes which have been extracted from the page set acquired by the to-be-analyzed page set acquiring unit using the correlation data stored in the correlation data storing unit and thereby acquiring information on which attribute should be modified and to what degree the chosen attribute should be modified, and predicting what effect on the hyperlink transition frequency between the pages of the page set will be obtained when the chosen attribute is so modified, on the assumption that the hyperlink transition frequency between the pages of the page set is to be changed; and a display unit for displaying the result obtained by the attribute analyzing unit.

6. A hypertext analyzing system comprising:

an access similarity analyzing unit for analyzing access history information on each of page sets which constitute a hypertext system and thereby calculating a page-to-page access similarity which represents the degree of access made to both pages of the page set concerned by users;

an attribute extracting unit for extracting at least two of a plurality of presentation attributes from the page set or from a hypertext which contains the page set;

a correlation analyzing unit for calculating a correlation between the page-to-page access similarity and each of the at least two attributes;

a correlation data storing unit for storing data obtained by the correlation analyzing unit;

an attribute analyzing unit for comparing the at least two attributes which have been extracted from a designated page set or from a hypertext structure containing the page set using the correlation data stored in the correlation data storing unit and thereby acquiring information on which attribute should be modified and to what degree the chosen attribute should be modified, and predicting what effect on the page-to-page access similarity between the pages of the page set will be obtained when the chosen attribute is so modified, on the assumption that the page-to-page access similarity between the pages of the page set is to be changed; and a display unit for displaying the result obtained by the attribute analyzing unit.

7. A hypertext analyzing system according to claim 6, wherein the correlation analyzing unit has a function of selecting attributes not considered to be effective at the time of calculating a correlation between the access similarity and the attributes, and the thus-selected attributes are ignored in the processing which follows.

8. A hypertext analyzing system comprising:

an access similarity analyzing unit for analyzing access history information on each of page sets which constitute a hypertext system and thereby calculating a page-to-page access similarity which represents the degree of access made to both pages of the page set concerned by users;

an attribute extracting unit for extracting at least two of a plurality of presentation attributes from the page set or from a hypertext which contains the page set;

a correlation analyzing unit for calculating a correlation between the page-to-page access similarity and each of the at least two attributes;

a correlation data storing unit for storing data obtained by the correlation analyzing unit;

a to-be-analyzed page set acquiring unit for calculating, using the access similarity analyzing unit, a page-to-page access similarity between arbitrary pages in a designated page group and acquiring a smaller page set with a page-to-page access similarity that falls below a predetermined threshold;

an attribute analyzing unit for comparing the at least two attributes which have been extracted from the page set acquired by the to-be-analyzed page set acquiring unit or from a hypertext structure which contains the page set using the correlation data stored in the correlation data storing unit and thereby acquiring information on which attribute should be modified and to what degree the chosen attribute should be modified, and predicting what effect on the page-to-page access similarity between the pages of the page set will be obtained when the chosen attribute is modified, on the assumption that the page-to-page access similarity between the pages of the page set is to be changed; and a display unit for displaying the result obtained by the attribute analyzing unit.

9. A hypertext analyzing system comprising:

an access similarity analyzing unit for analyzing access history information on each of page sets which constitute a hypertext system and thereby calculating a page-to-page access similarity which represents the degree of access made to both pages of the page set concerned by users;

an attribute extracting unit for extracting at least two of a plurality of presentation attributes from the page set or from a hypertext which contains the page set;

a correlation analyzing unit for calculating a correlation between the page-to-page access similarity and each of the at least two attributes;

a correlation data storing unit for storing data obtained by the correlation analyzing unit;

a to-be-analyzed page set acquiring unit for calculating, using the access similarity analyzing unit, a page-to-page access similarity between arbitrary pages in a designated page group, and further calculating a content similarity between the pages with use of the attribute extracting unit, and on the basis of a ratio between the page-to-page access similarity and the content similarity, acquiring a smaller page set with a page-to-page access similarity that falls below a predetermined threshold despite the pages being similar in content;

an attribute analyzing unit for comparing the at least two attributes which have been extracted from the page set acquired by the to-be-analyzed page set acquiring unit or from a hypertext structure which contains the page set using the correlation data stored in the correlation data storing unit and thereby acquiring information on which attribute should be modified and to what degree the chosen attribute should be modified, and what effect on the page-to-page access similarity between the pages of the page set will be obtained when the chosen attribute is so modified, on the assumption that the page-to-page access similarity between the pages of the page set is to be changed; and a display unit for displaying the result obtained by the attribute analyzing unit.

10. A hypertext analyzing system comprising:

a hyperlink transition frequency acquiring unit for analyzing access history information on the access to a hypertext system, also analyzing a hyperlink structure, and calculating a hyperlink transition frequency between pages linked by a hyperlink;

an attribute extracting unit for extracting at least two of a plurality of presentation attributes from a page set linked by a hyperlink;

a correlation analyzing unit for calculating a correlation between the hyperlink transition frequency and each of the at least two attributes;

a correlation data storing unit for storing data obtained by the correlation analyzing unit;

an attribute analyzing unit for comparing the at least two attributes which have been extracted from a designated page set using the correlation data stored in the correlation data storing unit and thereby acquiring information on which attribute should be modified and to what degree the chosen attribute should be modified, and predicting what effect on the the page-to-page hyperlink transition frequency will be obtained when the chosen attribute is so modified, on the assumption that the page-to-page hyperlink transition frequency is to be changed;

a display unit for displaying the result obtained by the attribute analyzing unit;

an editing unit for modifying the contents of the designated page set while making reference to the displayed result; and a contents modification effect analyzing unit for comparing attributes which have been extracted, using the attribute extracting unit, from the contents modified by the editing unit with the correlation data stored in the correlation data storing unit, thereby predicting the page-to-page hyperlink transition frequency between the pages of the page set, and calculating a modification effect, the result obtained by the contents modification effect analyzing unit being displayed in the display unit.

11. A hypertext analyzing system comprising:

an access similarity analyzing unit for analyzing access history information on each of page sets which constitute a hypertext system and thereby calculating a page-to-page access similarity which represents the degree of access made to both pages of the page set concerned by users;

an attribute extracting unit for extracting at least two of a plurality of presentation attributes from the page set or from a hypertext which contains the page set;

a correlation analyzing unit for calculating a correlation between the page-to-page access similarity and each of the at least two attributes;

a correlation data storing unit for storing data obtained by the correlation analyzing unit;

an attribute analyzing unit for comparing the at least two attributes which have been extracted from a designated page set or from a hypertext structure containing the page set using the correlation data stored in the correlation data storing unit and thereby acquiring information on which attribute should be modified and to what degree it should be modified, and predicting what effect on the the page-to-page access similarity in the page set will be obtained when the chosen attribute is so modified, on the assumption that the page-to-page access similarity in the page set is to be changed;

a display unit for displaying the result obtained by the attribute analyzing unit;

an editing unit for modifying the contents of the designated page set while making reference to the displayed result; and a contents modification effect analyzing unit for comparing attributes which have been extracted, using the attribute extracting unit, from the contents modified in the editing unit with the correlation data stored in the correlation data storing unit, thereby predicting the page-to-page access similarity, and calculating a modification effect, the result obtained by the contents modification effect analyzing unit being displayed in the display unit.

12. A hypertext analyzing method comprising:

analyzing access history information on the access to a hypertext system, also analyzing a hyperlink structure, and calculating a hyperlink transition frequency between pages linked by a hyperlink;

extracting at least two of a plurality of presentation attributes from a page set linked by a hyperlink;

calculating a correlation between the hyperlink transition frequency and each of the at least two attributes;

storing the calculated correlation;

comparing the at least two attributes which have been extracted from a designated page set using the stored correlation, and thereby acquiring information on which attribute should be modified and to what degree the chosen attribute should be modified, and predicting what effect on the hyperlink transition frequency between the pages of the page set will be obtained when the chosen attribute is so modified, on the assumption that the hyperlink transition frequency between the pages of the page set is to be changed; and displaying the acquired result.

13. A hypertext analyzing method comprising:

analyzing access history information on each of page sets which constitute a hypertext system and thereby calculating a page-to-page access similarity which represents the degree of access made to both pages of the page set concerned by users;

extracting at least two of a plurality of presentation attributes from the page set or from a hypertext which contains the page set;

calculating a correlation between the page-to-page access similarity and each of the at least two attributes;

storing the calculated correlation;

comparing the at least two attributes which have been extracted from a designated page set or from a hypertext structure containing the page set using the stored correlation, and thereby acquiring information on which attribute should be modified and to what degree the chosen attribute should be modified, and predicting what effect on the page-to-page access similarity between the pages of the page set will be obtained when the chosen attribute is so modified on the assumption that the page-to-page access similarity between the pages of the page set is to be changed; and displaying the acquired result.

14. A recording medium capable of being read by a computer, the recording medium having a program for hypertext analysis recorded therein, the program being used for allowing the computer to execute hypertext analysis comprising:

analyzing access history information on the access to a hypertext system, also analyzing a hyperlink structure, and calculating a hyperlink transition frequency between pages linked by a hyperlink;

extracting at least two of a plurality of presentation attributes from a page set linked by a hyperlink;

calculating a correlation between the hyperlink transition frequency and each of the at least two attributes;

storing the calculated correlation;

comparing the at least two attributes which have been extracted from a designated page set using the stored correlation, and thereby acquiring information on which attribute should be modified and to what degree the chosen attribute should be modified, and what effect on the hyperlink transition frequency between the pages of the page set will be obtained when the chosen attribute is so modified, on the assumption that the hyperlink transition frequency between the pages of the page set is to be changed; and displaying the acquired result.

15. A recording medium capable of being read by a computer, the recording medium having a program for hypertext analysis recorded therein, the program being used for allowing the computer to execute hypertext analysis comprising:

analyzing access history information on each of page sets which constitute a hypertext system and thereby calculating a page-to-page access similarity which represents the degree of access made to both pages of the page set concerned by users;

extracting at least two of a plurality of presentation attributes from the page set or from a hypertext which contains the page set;

calculating a correlation between the page-to-page access similarity and each of the at least two attributes;

storing the calculated correlation;

comparing the at least two attributes which have been extracted from a designated page set or from a hypertext structure containing the page set using the stored correlation, and thereby acquiring information on which attribute should be modified and to what degree the chosen attribute should be modified, and predicting what effect on the page-to-page access similarity between the pages of the page set will be obtained when the chosen attribute is so modified on the assumption that the page-to-page access similarity between the pages of the page set is to be changed; and displaying the acquired result.

* * * * *